(12) United States Patent
Ogihara

(10) Patent No.: US 10,623,338 B2
(45) Date of Patent: Apr. 14, 2020

(54) INFORMATION PROCESSING DEVICE, INFORMATION PROCESSING METHOD AND NON-TRANSITORY COMPUTER-READABLE STORAGE MEDIUM

(71) Applicant: FUJITSU LIMITED, Kawasaki-shi, Kanagawa (JP)

(72) Inventor: Kazutaka Ogihara, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 21 days.

(21) Appl. No.: 16/177,485

(22) Filed: Nov. 1, 2018

(65) Prior Publication Data
US 2019/0149483 A1 May 16, 2019

(30) Foreign Application Priority Data

Nov. 14, 2017 (JP) .................................. 2017-219158

(51) Int. Cl.
*G06F 15/173* (2006.01)
*H04L 12/947* (2013.01)
(Continued)

(52) U.S. Cl.
CPC ............ *H04L 49/252* (2013.01); *H04L 43/00* (2013.01); *H04L 43/04* (2013.01); *H04L 43/16* (2013.01); *H04L 43/18* (2013.01); *H04L 45/74* (2013.01); *H04L 63/00* (2013.01); *H04L 67/1097* (2013.01); *H04L 67/40* (2013.01);
(Continued)

(58) Field of Classification Search
CPC ....... H04L 49/252; H04L 43/00; H04L 43/04; H04L 43/16; H04L 43/18; H04L 45/74; H04L 63/00; H04L 67/1097; H04L 67/40; H04L 67/1095; H04L 69/163; H04L 69/22

See application file for complete search history.

(56) References Cited

U.S. PATENT DOCUMENTS 6,026,093 A * 2/2000 Bellaton ................. H04L 47/62
370/412
6,219,339 B1 * 4/2001 Doshi ................. H04L 12/5602
370/235

(Continued)

FOREIGN PATENT DOCUMENTS

JP 2011-182211 9/2011
JP 2014-042290 3/2014

*Primary Examiner* — Philip B Tran
(74) *Attorney, Agent, or Firm* — Fujitsu Patent Center

(57) ABSTRACT

An information processing device including a processor configured to execute a process including when a first packet is captured, extracting, from the first packet, first element data corresponding to a session, storing the extracted first element data in association with the first packet and the session, when second element data associated with a second packet and the session is stored, coupling the extracted first element data to the second element data, obtaining, for each of the first packet and the second packet, a data value from a predetermined position in a packet, and when a data size of a specific element data that is one of the first element data and the second element data matches the obtained data value corresponding to the packet associated with the specific element data, discarding element data, associated with the session, other than the specific element data.

8 Claims, 15 Drawing Sheets

(51) Int. Cl.
    *H04L 12/26*     (2006.01)
    *H04L 12/741*     (2013.01)
    *H04L 29/06*     (2006.01)
    *H04L 29/08*     (2006.01)

(52) U.S. Cl.
    CPC ........ *H04L 67/1095* (2013.01); *H04L 69/163* (2013.01); *H04L 69/22* (2013.01)

(56) References Cited

U.S. PATENT DOCUMENTS

| | | | |
|---|---|---|---|
| 2004/0083299 A1 | 4/2004 | Dietz et al. | |
| 2010/0220611 A1* | 9/2010 | Zhang | H04L 49/9042 370/252 |
| 2012/0127927 A1* | 5/2012 | Meirick | H04L 47/14 370/328 |
| 2013/0107890 A1* | 5/2013 | Hyoudou | H04L 47/17 370/412 |
| 2013/0336320 A1* | 12/2013 | Rangaraman | H04L 45/38 370/392 |
| 2015/0222558 A1* | 8/2015 | Maeda | H04L 49/555 370/412 |

\* cited by examiner

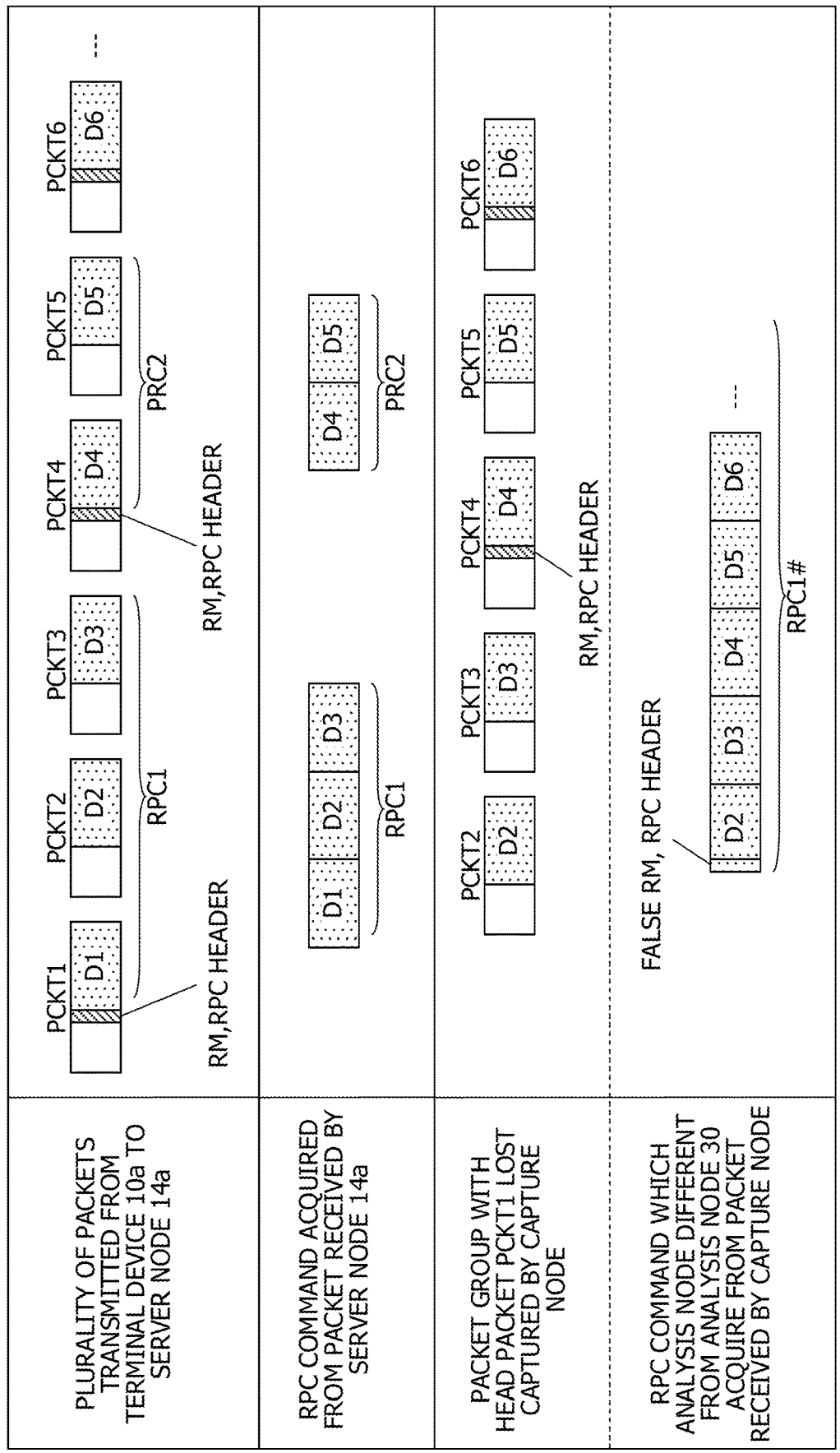

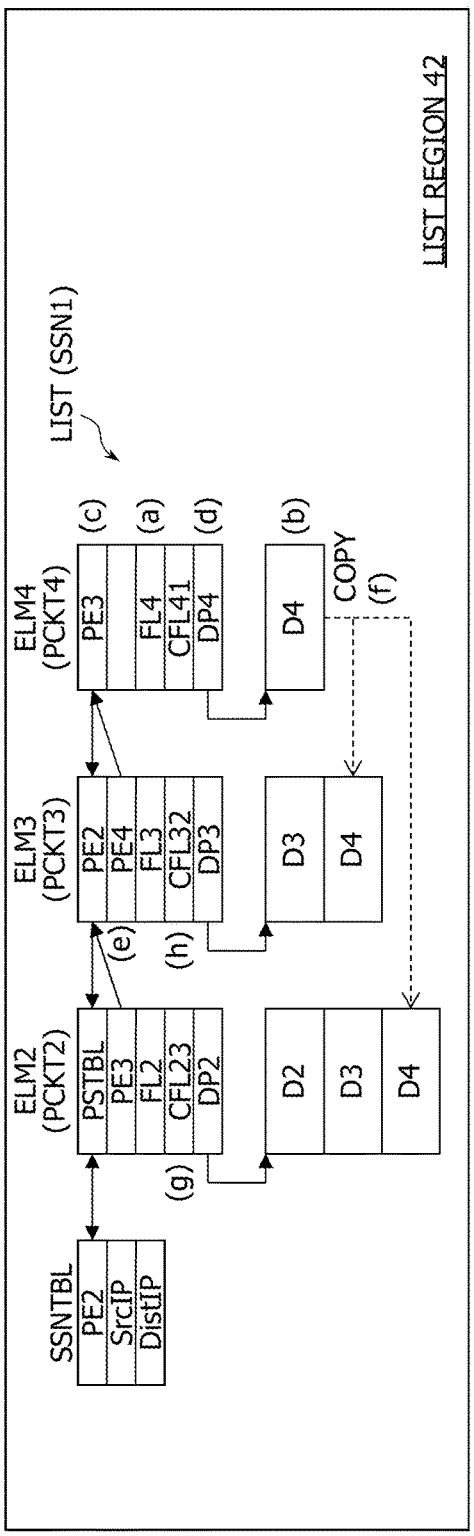
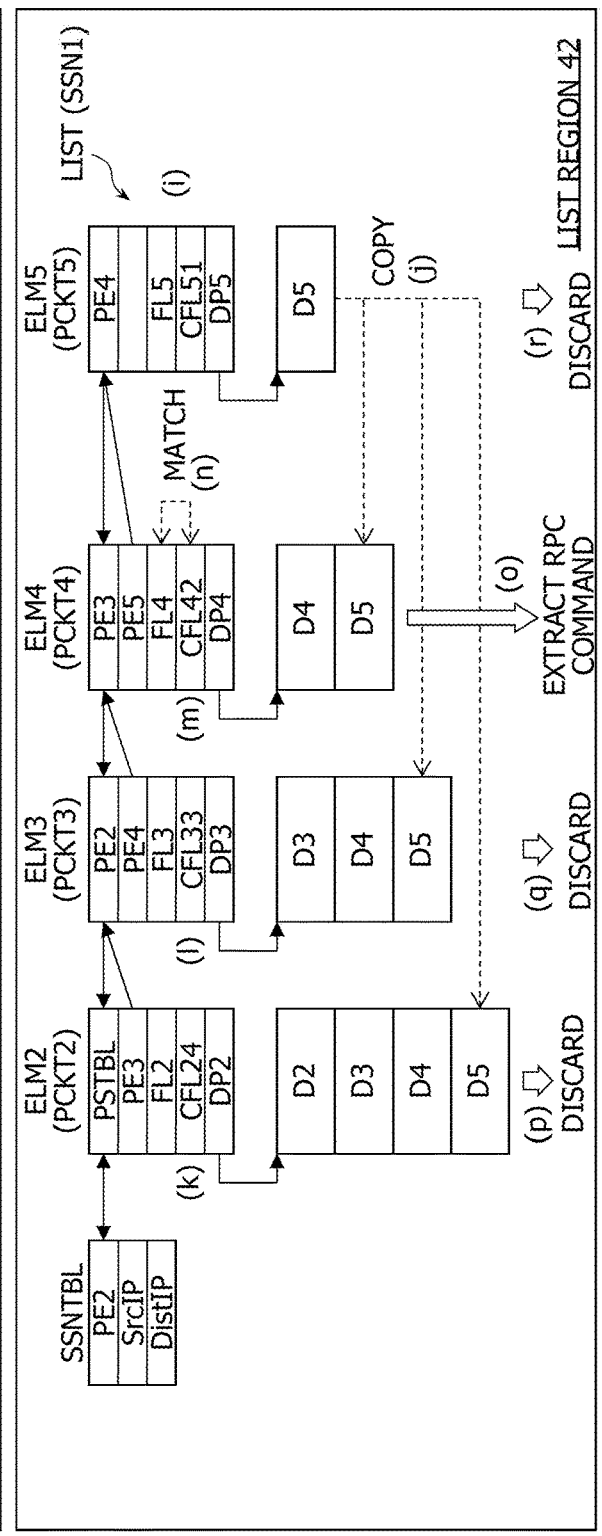
FIG. 8A
FIG. 8B

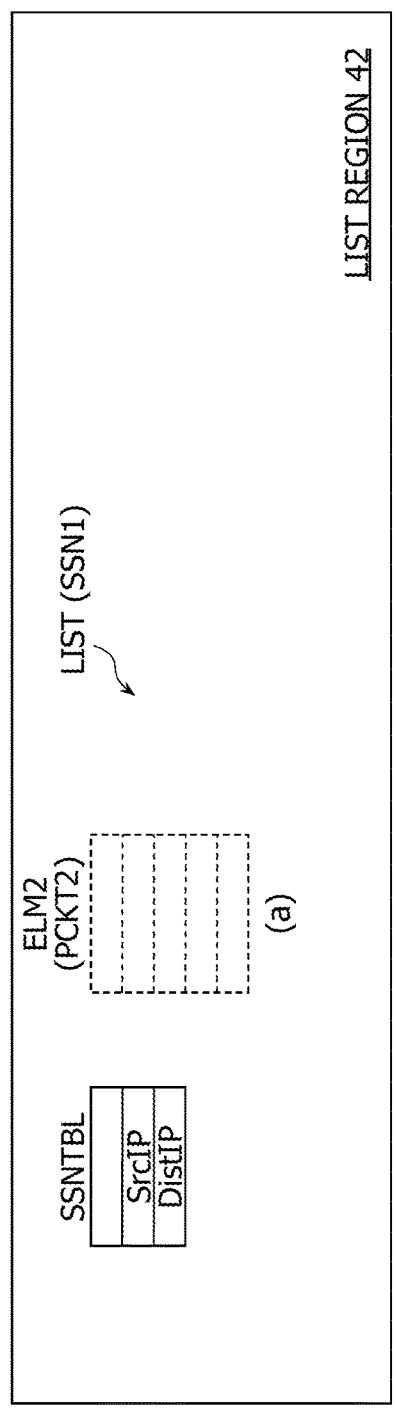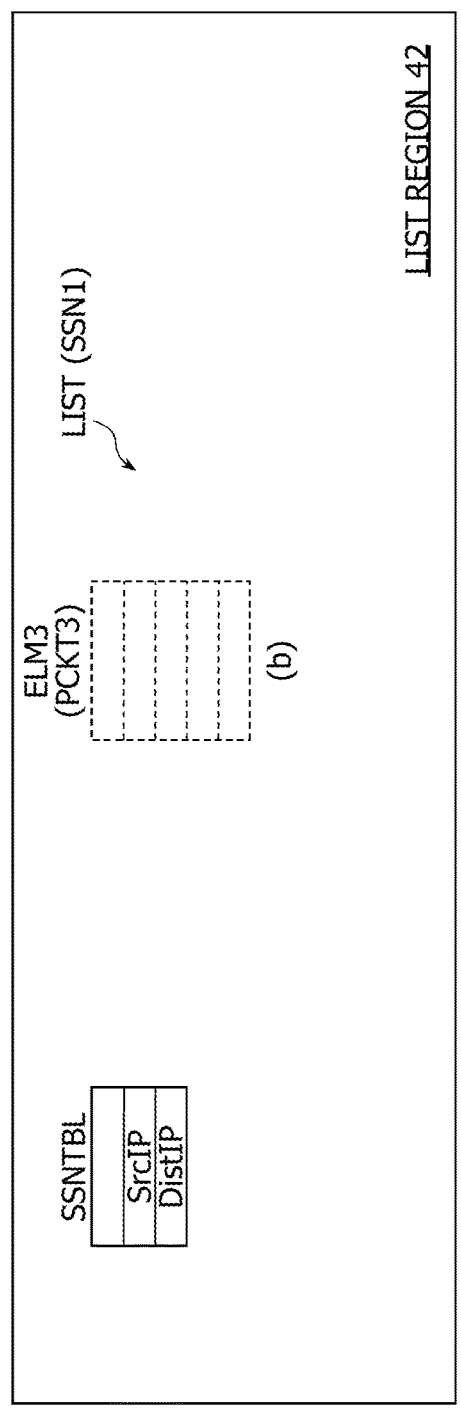

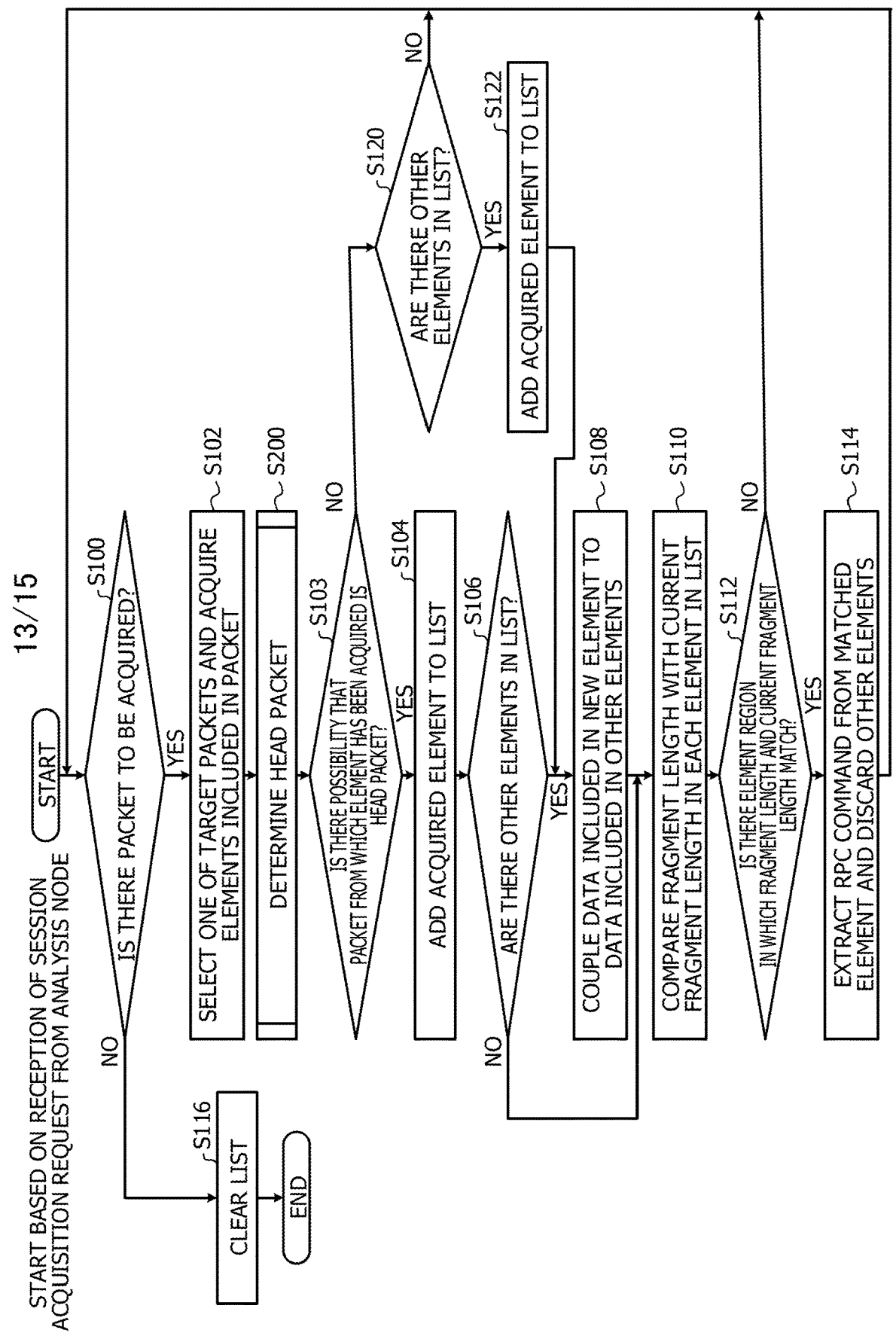

INFORMATION PROCESSING DEVICE, INFORMATION PROCESSING METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-219158, filed on Nov. 14, 2017, the entire contents of which are incorporated herein by reference.

FIELD

The embodiments discussed herein are related to an information processing device, an information processing method, and a non-transitory computer-readable storage medium.

BACKGROUND

An analyzer that analyzes a message transmitted between computers acquires a packet passing through a switch connected to the computer by mirroring or the like, and stores the acquired packet in a storage unit such as a packet buffer. In a case where the size of the message transmitted between the computers is larger than the size that may be accommodated in one packet as a unit of transmission, the message is divided into a plurality of parts, stored in each of a plurality of packets, and transmitted as a group of packets. The analyzer couples the divided message parts included in the packet group, whereby assembles the divided message parts into the original message, and analyzes the assembled original message (For example, see Japanese Laid-open Patent Publication No. 2014-042290).

For example, a device that transmits packets sets the transmission interval of the packets between different messages to be longer than the transmission interval of the packets within one and the same message. Utilizing this property, the packet analyzer determines that a packet whose reception interval is equal to or greater than a predetermined threshold value is a head packet of the packet group including the divided message to perform a message reception process (For example, see Japanese Laid-open Patent Publication No. 2011-182211).

SUMMARY

According to an aspect of the embodiments, an information processing device including a memory, and a processor coupled to the memory and the processor configured to execute a process, the process including, when a first packet transmitted from a communication device to another communication device via a network is captured, extracting, from the first packet, first element data corresponding to a session used for communication of the first packet, storing, in a storage device, the extracted first element data in association with the first packet and the session, when second element data associated with a second packet and the session is stored in the storage unit, coupling the extracted first element data to the second element data, obtaining, for each of the first packet and the second packet, a data value from a predetermined position in a packet, the predetermined position being a position at which a fragment length is stored in a case where the packet is a head packet, and when a data size of a specific element data that is one of the first element data and the second element data, for which the coupling has been executed, matches the obtained data value corresponding to the packet associated with the specific element data, discarding element data, associated with the session, other than the specific element data from the storage device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a plurality of packets transmitted via a network switch illustrated in FIG. 3, and an example in a case where a capture node illustrated in FIG. 3 captures the packets with the head packet lost;

FIGS. 8A and 8B are diagrams illustrating a subsequent operation of the analysis node in FIGS. 7A and 7B;

FIGS. 11A and 11B are diagrams illustrating an example of an operation of an analysis node illustrated in FIG. 10;

FIG. 13 is a diagram illustrating an example of an operation flow of an analysis node illustrated in FIG. 10;

DESCRIPTION OF EMBODIMENTS

Recently, the transmission rate of packets transmitted on a transmission path such as a network tends to increase, and the difference between the transmission interval of the packets between different messages and the transmission interval of the packets within one and the same message has decrease. Therefore, in a method of determining a head packet based on the packet reception interval, a packet other than the head packet may be erroneously determined as a head packet. In a case where the determination of the head packet is wrong, an enormous amount of erroneous messages may be acquired.

In one aspect, the techniques disclosed in the embodiments intend to leave packets containing a message in a storage unit while discarding from the storage unit packets not including a message to be acquired.

Hereinafter, embodiments will be described with reference to the drawings.

Figure 1:
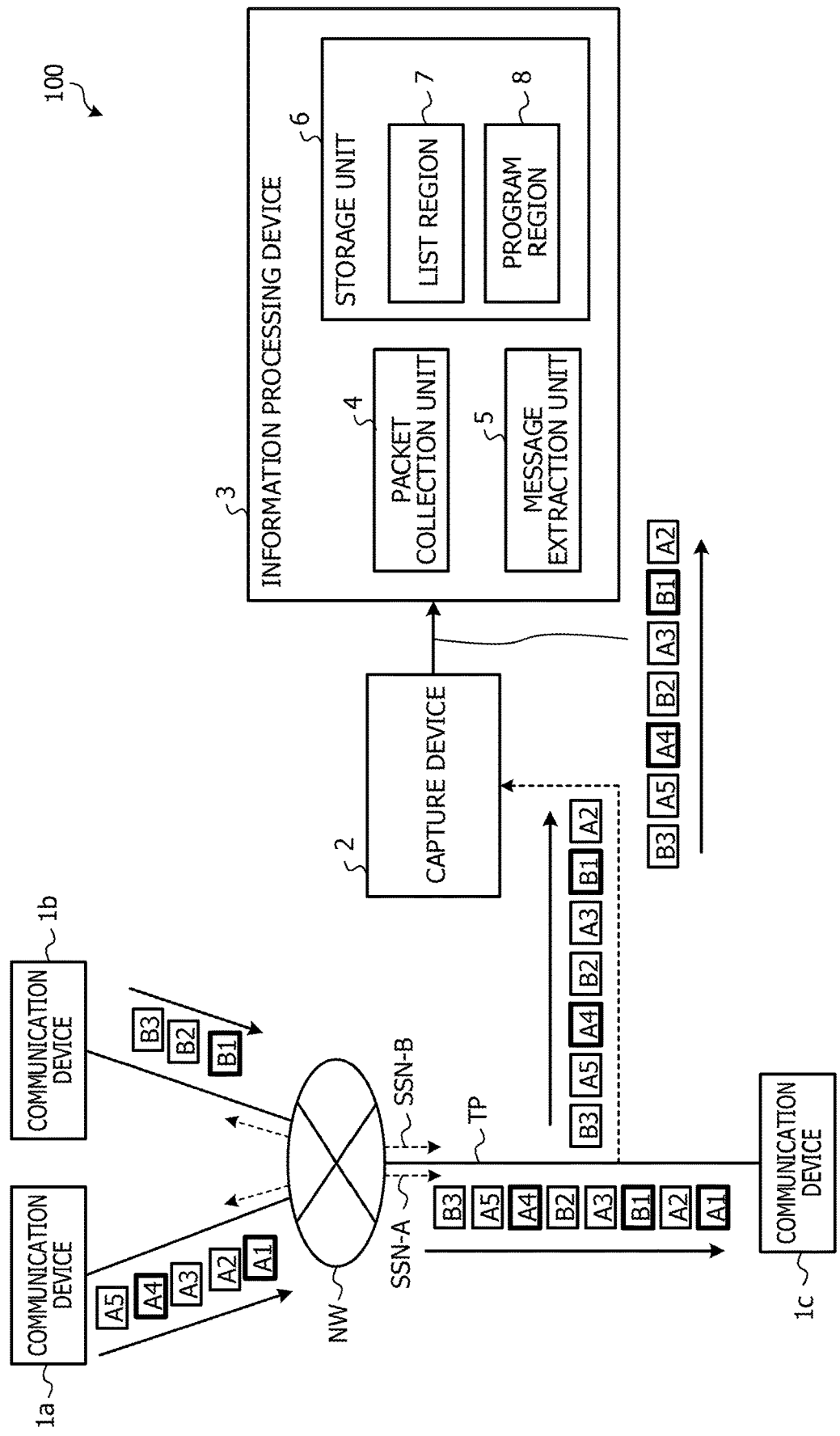
FIG. 1 is a diagram illustrating an embodiment of an information processing device, an information processing method, and a program.

FIG. 1 is a diagram illustrating an embodiment of an information processing device, an information processing method, and a program. An information processing system 100 illustrated in FIG. 1 includes a capture device 2 and an information processing device 3. The capture device 2 has a function of capturing, via a network NW such as the Internet or an intranet, packets A (A1, A2, A3, A4, A5) and B (B1, B2, B3) transmitted between the communication devices 1 (1a, 1b, 1c). For example, the capture device 2 captures a packet transmitted to a transmission path TP connecting the communication device 1c to the network NW.

For example, the communication devices 1a, 1b and 1c transmit a packet using transmission control protocol/internet protocol (TCP/IP), which is a standard protocol of the Internet. Communication between the communication devices 1a and 1c is also referred to as a session SSN-A, and communication between the communication devices 1b and 1c is also referred to as a session SSN-B.

In the example illustrated in FIG. 1, the communication device 1a transmits the packets A1 to A5 to the communication device 1c, and the communication device 1b transmits the packets B1 to B3 to the communication device 1c. For the communication device 1a, since the size of the message to be transmitted to the communication device 1c is more than twice and 3 times or less the size that may be accommodated in one packet, the message is divided into three packets A1 to A3 and transmitted. For the communication device 1a, since the size of the next message to be transmitted to the communication device 1c is more than the size and 2 times or less the size that may be accommodated in one packet, the message is divided into two packets A4 to A5 and transmitted.

Similarly, for the communication device 1b, since the size of the message to be transmitted to the communication device 1c is more than twice and 3 times or less the size that may be accommodated in one packet, the message is divided into three packets B1 to B3 and transmitted. Each of the packets A1, A4, and B1 indicated by the bold frame indicates a head packet among a plurality of packets used for transmission of each message.

For example, a head packet includes a fragment region storing a fragment length which is a size before division of a message at the head of a data payload region where data is stored. Packets other than the head packet have no fragment region. For packets other than the head packet, the value stored at the position corresponding to the fragment region is not the fragment length, but data included in the message.

In the example illustrated in FIG. 1, the capture device 2 misses the capture of the packet A1 due to the capture operation start timing error or the capture operation error or the like. The capture device 2 sequentially captures the packets A2, B1, A3, B2, A4, A5, and B3 other than the packet A1, and the captured packets are stored in a storage device (not illustrated). The capture device 2 outputs the captured packets A2, B1, A3, B2, A4, A5, and B3 to the information processing device 3.

The capture device 2 may output, based on a packet acquisition request from the information processing device 3, a packet satisfying the acquisition condition included in the packet acquisition request to the information processing device 3. For example, the capture device 2 outputs the packets A2, B1, A3, B2, A4, A5, and B3 satisfying the acquisition condition to the information processing device 3 in a case where the acquisition condition included in the packet acquisition request received from the information processing device 3 is "the packet received by the communication device 1c".

The information processing device 3 includes a packet collection unit 4, a message extraction unit 5, and a storage unit 6. The storage unit 6 has a list region 7 in which a list to be described later is stored, and a program region 8 in which a program is stored. The storage unit 6 may be arranged outside the information processing device 3. For example, the functions of the packet collection unit 4 and the message extraction unit 5 are implemented by the information processing device 3 performing the program stored in the program region 8. The functions of the packet collection unit 4 and the message extraction unit 5 may be implemented by hardware such as field-programmable gate array (FPGA) owned by the information processing device 3.

The packet collection unit 4 performs the following processing on the assumption that each of the packets A2 to A5, and B1 to B3 is the head packet. The packet collection unit 4 stores an element included in each of the packets A2 to A5 corresponding to the session SSN-A in the list region 7 in the order of reception. The packet collection unit 4 stores an element included in each of the packets B1 to B3 corresponding to the session SSN-B in the list region 7 in the order of reception. For example, the element included in each of the packets A2 to A5 is sequentially stored in the list region 7 in association with the session SSN-A, and the element included in each of the packets B1 to B3 are sequentially stored in the list region 7 in association with the session SSN-B. In the following, an element included in a packet is given the same reference numerals as those of packets containing the element.

In a case where the element of the packet A corresponding to the session SSN-A has been already stored in the list region 7, the packet collection unit 4 couples the data included in the new packet A to the data included in the element already stored in the list region 7. Similarly, in a case where the element of the packet B corresponding to the session SSN-B has been already stored in the list region 7, the packet collection unit 4 couples the data in the new packet B to the data included in the element already stored in the list region 7. An example of the operation of the packet collection unit 4 is described in FIG. 2.

The message extraction unit 5 performs the following processing on the assumption that each of the packets A2 to A5 and B1 to B3 is the head packet. In each of the elements of the packets A2 to A5 stored in the list region 7 in association with the session SSN-A, the message extraction unit 5 assumes the value stored at the position corresponding to the fragment region of the head packet as the fragment length. In a case where there is an element in which the size of the coupled data matches the assumed fragment length, the message extraction unit 5 determines that the data included in the matched element is a message.

The message extraction unit 5 discards elements other than the matched elements from the list region 7. An example of the operation of the message extraction unit 5 will be described with reference to FIG. 2. In a case where a message may be accommodated in one packet, the message is transmitted using only the head packet. In this case, since the size of the data included in the packet matches the fragment length, the message extraction unit 5 determines that the data included in the element stored in the list region 7 in accordance with a single packet is a message.

Figure 2:
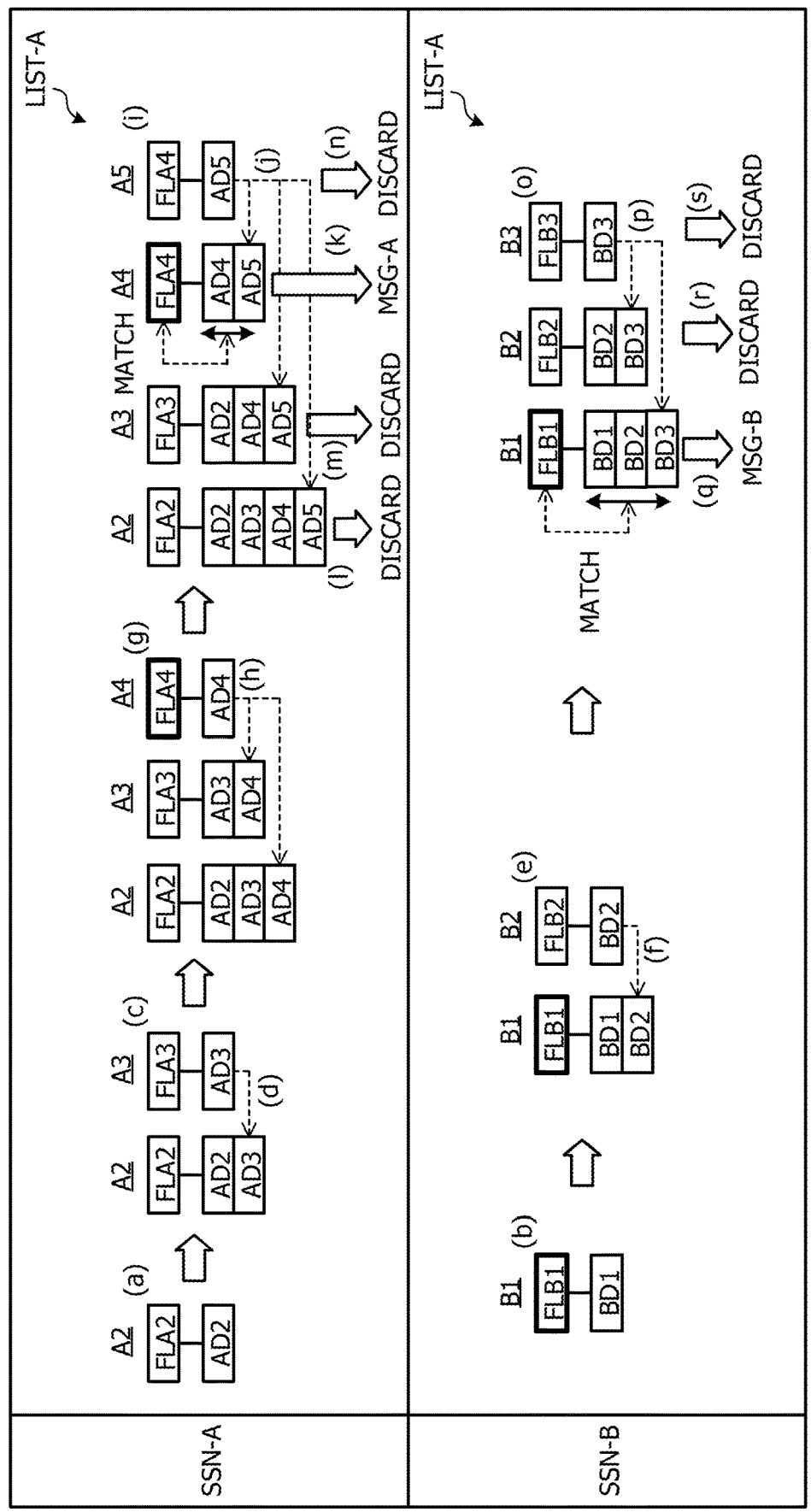
FIG. 2 is a diagram illustrating an example of an operation of the information processing device illustrated in FIG. 1.

FIG. 2 illustrates an example of the operation of the information processing device 3 illustrated in FIG. 1. FIG. 2 illustrates how the lists LIST-A and LIST-B stored in the list region 7 illustrated in FIG. 1 change. The packet collection unit 4 illustrated in FIG. 1 creates the list LIST-A using the packets A received from the capture device 2 in accordance with the session SSN-A. The packet collection unit 4 creates the list LIST-B using the packets B received from the capture device 2 in accordance with the session SSN-B. In the following, in the list region 7, a region in which an element included in each packet is stored is referred to as an element region, and each element region is given the same reference numeral as that of the corresponding packet.

As described in FIG. 1, the packet collection unit 4 and the message extraction unit 5 treat each of the packets A and B received from the capture device 2 as a head packet. The elements included in the element regions A (A1 to A5) of the list LIST-A include the fragment lengths FLA (FLA1 to FLA5) and the data AD (AD1 to AD5). The elements included in the element regions B (B1 to B3) of the list LIST-B include the fragment lengths FLB (FLB1 to FLB3) and data BD (BD1 to BD3). The fragment lengths FLB1 and FLA4 indicated by the bold frames are the correct fragment lengths included in the head packet. Fragment lengths FLA2, FLA3, FLA5, and FLB2, and FLB3 indicated by the non-bold frame are false fragment lengths which are not correct fragment lengths (nonsense value). This is because, in a packet other than the head packet, the data stored at the position corresponding to the position where the fragment length is stored in the head packet is referred to as a false fragment length.

First, the packet collection unit 4 stores the false fragment length FLA2 included in the packet A2 and the data AD2 included in the packet A2 in the element region A2 of the list LIST-A ((a) in FIG. 2). The message extraction unit 5 determines that the packet A2 is not the head packet since the sizes of the fragment length FLA2 and the data AD2 do not match in the element region A2, and determines that the data AD2 is not a message.

The packet collection unit 4 stores the correct fragment length FLB1 included in the packet B1 and the data BD1 included in the packet B1 in the element region B1 of the list LIST-B ((b) in FIG. 2). The message extraction unit 5 determines that the packet B1 is not the head packet at this time since the sizes of the fragment length FLB1 and the data BD1 do not match in the element region B1, and determines that the data BD1 is not a message.

Next, the packet collection unit 4 stores the false fragment length FLA3 included in the packet A3 and the data AD3 included in the packet A3 in the element region A3 of the list LIST-A ((c) in FIG. 2). Since the element is already included in the element region A2 corresponding to the session SSN-A, the packet collection unit 4 couples the data AD3 included in the packet A3 to the data AD2 included in the element region A2 ((d) in FIG. 2). In the example illustrated in FIG. 2, the packet collection unit 4 copies the data AD3 included in the element region A3 to the element region A2, thereby coupling the data AD3 to the data AD2. Using a pointer indicating the position of the data, the data AD3 may be coupled to the data AD2. For the coupling of the other data, similarly, a pointer indicating the position of the data may be used.

The message extraction unit 5 determines that the packet A2 is not the head packet since the sizes of the fragment length FLA2 and the sum of the sizes of the data AD2 and AD3 do not match in the element region A2, and determines that the data string by the data AD2 and AD3 is not a message. The message extraction unit 5 determines that the packet A3 is not the head packet since the sizes of the fragment length FLA3 and the data AD3 do not match in the element region A3, and determines that the data AD3 is not a message.

Nest, the packet collection unit 4 stores the false fragment length FLB2 included in the packet B2 and the data BD2 included in the packet B2 in the element region B2 of the list LIST-B ((e) in FIG. 2). Since the element is already included in the element region B1 corresponding to the session SSN-B, the packet collection unit 4 couples the data BD2 included in the packet B2 to the data BD1 in the element region B1 ((f) in FIG. 2). The message extraction unit 5 determines that the packet B1 is not the head packet at this time since the fragment length FLB1 and the sum of the sizes of the data BD1 and BD2 do not match in the packet B1, and determines that the data string by the data BD1 and BD2 is not a message. The message extraction unit 5 determines that the packet B2 is not the head packet since the sizes of the fragment length FLB2 and the data BD2 do not match, and determines that the data BD2 is not a message.

Next, the packet collection unit 4 stores the correct fragment length FLA4 included in the packet A4 and the data AD4 included in the packet A4 in the element region A4 of the list LIST-A ((g) in FIG. 2). Since the elements are already included in the element regions A2 and A3 corresponding to session SSN-A, the packet collection unit 4 couples the data AD4 in the packet A4 to AD2 and AD3 in the element region A2, and couples the data AD4 in the packet A4 to the data AD3 in the element region A3 ((h) in FIG. 2).

The message extraction unit 5 determines that the packet A2 is not the head packet since the sizes of the fragment length FLA2 and the sum of the sizes of the data AD2 to AD4 do not match in the element region A2, and determines that the data string by the data AD2 to AD4 is not a message. The message extraction unit 5 determines that the packet A3 is not the head packet since the sizes of the fragment length FLA3 and the sum of the sizes of the data AD3 and AD4 do not match in the element region A3, and determines that the data string by the data AD3 and AD4 is not a message. The message extraction unit 5 determines that the packet A4 is not the head packet at this time since the sizes of the fragment length FLA4 and the data AD4 do not match in the element region A4, and determines that the data AD4 is not a message.

Next, the packet collection unit 4 stores the false fragment length FLA5 included in the packet A5 and the data AD5 included in the packet A5 in the element region A5 of the list LIST-A ((i) in FIG. 2). Since the elements are already included in the element regions A2, A3, and A4 corresponding to the session SSN-A, the packet collection unit 4 couples the data AD5 in the packet A5 to the data AD2 to AD4 in the element region A2. The packet collection unit 4 couples the data AD5 in the packet A5 to the data AD3 and AD4 in the element region A3, and couples the data AD5 in the packet A5 to the data AD4 in the element region A4 ((j) in FIG. 2).

The message extraction unit 5 determines that the packet A2 is not the head packet since the sizes of the fragment length FLA2 and the sum of the sizes of the data AD2 to AD5 do not match in the element region A2, and determines that the data string by the data AD2 to AD5 is not a message. The message extraction unit 5 determines that the packet A3 is not the head packet since the sizes of the fragment length FLA3 and the sum of the sizes of the data AD3 to AD5 do not match in the element region A3, and determines that the data string by the data AD3 to AD5 is not a message.

Since the fragment length FLA4 and the sum of the sizes of the data AD4 and AD5 match in the element region A4, the message extraction unit 5 determines that the packet A4 is the head packet, and the data string by the data AD4 and AD5 is the message MSG-A ((k) in FIG. 2). In a case where finding the head packet A4, the message extraction unit 5 discard the elements included in the element regions A2, A3, and A5 other than the element region A4 corresponding to the head packet A4 ((l), (m) and (n) in FIG. 2).

The message extraction unit 5 extracts, based on the detection of the head packet A4, extract the message MSG-A from the list LIST-A to output the extracted message to an analysis unit (not illustrated) of the information processing device 3. Thereafter, the message extraction unit 5 discards from the list LIST-A the element included in the element region A4 including the message MSG-A. The analysis unit analyzes the message MSG-A, and depending on the analysis result, finds the cause of communication failure or the like occurring in the communication path between the communication devices 1a and 1c.

Next, the packet collection unit 4 stores the false fragment length FLB3 included in the packet B3, and the data BD3 included in the packet B3 in the element region B3 of the list LIST-B ((o) in FIG. 2). Since the elements are already included in the element regions B1 and B2 corresponding to the session SSN-B, the packet collection unit 4 couples the data BD3 in the packet B3 to the data BD1 and BD2 in the element region B1, and couples the data BD3 in the packet B3 to the data BD2 in the element region B2 ((p) in FIG. 2).

The message extraction unit 5 determines that the data string by the data BD1 to BD3 is the message MSG-B since fragment length FLB1 and the sum of the sizes of the data BD1 to BD3 match in the element region B1 ((q) in FIG. 2). In a case where finding the message MSG-B from the list LIST-B, the message extraction unit 5 discards the elements included in the element regions B2 and B3 other than the element region B1 corresponding to the message MSG-B ((r) and (s) in FIG. 2).

Based on the detection of the head packet B1, the message extraction unit 5 extracts the message MSG-B from the list LIST-B, and after outputting the extracted message to the analysis unit (not illustrated), discards from the list LIST-B the element included in the element region B1 including the message MSG-B. The analysis unit analyzes the message MSG-B, and depending on the analysis result, finds the cause of communication failure or the like occurring in the communication path between the communication devices 1b and 1c.

In this way, in a case where the head packet is unknown and the process of finding the head packet by using the element region corresponding to each packet is performed, it is possible to leave only the element region corresponding to the head packet, and discard the elements included in the other element regions. Since the data including the message is stored in the element region corresponding to the head packet, it is possible to extract a message using the element region left in the list region 7.

The packet collection unit 4 copies the data AD5 included in the element region A5 to the element region A4, thereby coupling the data AD4 and AD5. As a result, the message extraction unit 5 may extract the message MSG-A from the list region 7 when the fragment length FLA4 matches the sum of the sizes of the data AD4 and AD5. For example, it is possible to quickly start the analysis processing of the message MSG-A, compared with the case where the message MSG-A is assembled after the fragment length FLA4 matches the sum of the sizes of the data AD4 and AD5.

The information processing device 3 performs a process of coupling the data on the assumption that all packets A2 to A5 are head packets, so that it is possible to acquire the message MSG-A even when the first received packet A2 is not the head packet. Since the message extraction unit 5 performs the detection operation of the head packet A4 in parallel with the operation of coupling the data, the message MSG-A may be acquired in a case where the head packet A4 is detected.

In a case where message acquisition processing is performed with packet A2 first received from capture device 2 as a head packet, the value stored at the position corresponding to the fragment region of the head packet is set to the fragment length (false) in the packet A2. For example, in a case where the false fragment length is the maximum value that may be set, the data included in each of packets A3, A4, A5 . . . following the packet A2 are coupled in an endless manner. As a result, neither the message MSG-A that has the packet A4 as the head packet nor other messages included in the packet received after the packet A5 may not be acquired, and it is not possible to analyze the message.

As described above, in the embodiment illustrated in FIGS. 1 and 2, the following effects may be obtained. In a case where the head packet is unknown and the process of finding the head packet by using the element region corresponding to each packet is performed, it is possible to leave only the element region corresponding to the head packet, and discard the elements included in the other element regions. For example, while discarding from the storage unit 6 a packet not including a message to be acquired, it is possible to leave a packet including the message in the storage unit 6. Since the data including the message is stored in the element region corresponding to the head packet, it is possible to extract a message using the element region left in the list region 7.

Since the data is coupled by copying the data included in the new element to the data in the other elements, it is possible to extract the message from the list region 7 when the fragment length matches the size of the coupled data. A process of coupling the data by assuming that all packets are head packets is performed, whereby it is possible to acquire the message even when the packet received first is not the head packet.

Even when the capture device 2 mixedly receives packets of a plurality of sessions, it is possible to store the packets in the list region 7 for each session to perform data coupling processing, head packet detection processing and message extraction processing. Even when packets of a plurality of sessions are mixedly received, it is possible to discard, for each session, the element corresponding to the packet that is not the head packet to leave the element including the message in the list region 7.

Figure 3:
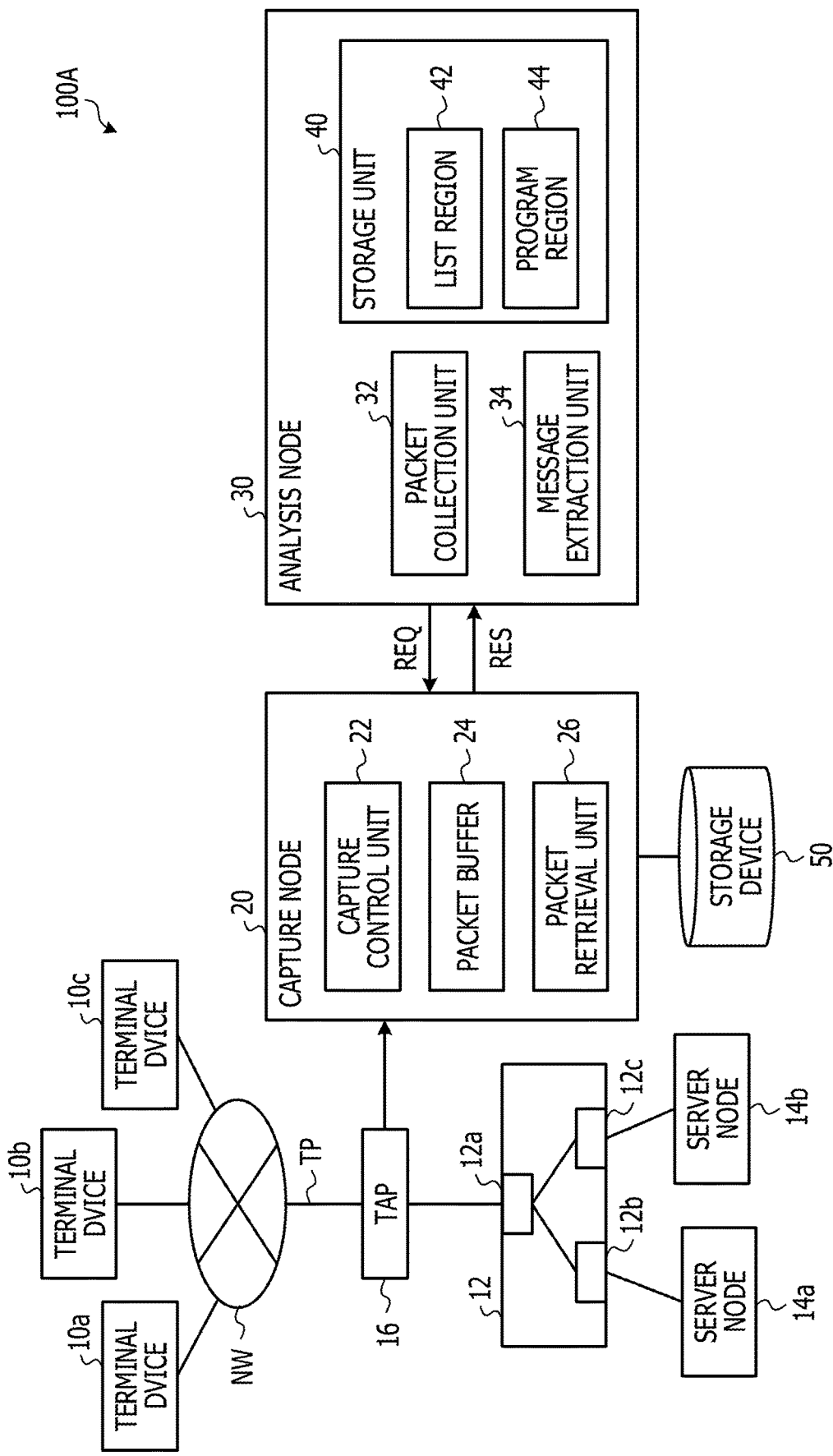
FIG. 3 is a diagram illustrating another embodiment of an information processing device, an information processing method, and a program.

FIG. 3 illustrates another embodiment of an information processing device, an information processing method, and a program. Elements which are the same as or similar to those in FIG. 1 are denoted by the same reference numerals, and a detailed description thereof will be omitted. An information processing system 100A illustrated in FIG. 3 includes a capture node 20 connected to a tap 16 provided in a packet transmission path, a storage device 50 connected to the capture node 20, and an analysis node 30 connected to the capture node 20. The capture node 20 is an example of a capture device, and the analysis node 30 is an example of an information processing device. The analysis node 30 may acquire the packet stored in the storage device 50 without through the capture node 20. The analysis node 30 may be included in the capture node 20. For example, the capture node 20 and the analysis node 30 may be incorporated in one server.

Terminal devices 10 (10a, 10b, 10c) and server nodes 14 (14a, 14b) are mutually connected via the network NW, the tap 16 and the network switch 12. The network NW is connected to a port 12a of the network switch 12 via the tap 16, and each of the server nodes 14a and 14b is connected to one of ports 12b and 12c of the network switch 12. The terminal device 10 and the server node 14 are examples of communication devices. For example, the terminal device 10 is a computer used by a user using the server node 14. The network switch 12 switches the path of packets transmitted and received between the terminal device 10 and the server node 14.

For example, in FIG. 3, a network file system (NFS) is constructed by the terminal device 10 and the server node 14. In this case, the terminal device 10 functions as an NFS client and the server node 14 functions as an NFS server. For example, the terminal device 10 and the server node 14 transmit and receive messages by a remote procedure call (RPC) using a TCP/IP. In the following description, a message transmitted and received by RPC is also referred to as a RPC command or a command RPC. In a case where the size of the RPC command is larger than the size that may be accommodated in one packet, the RPC command is divided into a plurality of parts, stored in each of a plurality of packets, and transmitted as a packet group.

The capture node 20 includes a capture control unit 22, a packet buffer 24, and a packet retrieval unit 26. The capture control unit 22 captures packets transmitted and received between the terminal device 10 and the server node 14 via the tap 16, and sequentially stores the captured packets in the packet buffer 24. For example, in a case where a predetermined amount of packets is stored in the packet buffer 24, the capture control unit 22 stores a predetermined amount of packets in the storage device 50.

The packet retrieval unit 26 retrieves and acquires the packet to be acquired from the storage device 50 based on the packet acquisition request REQ from the analysis node 30, and outputs the acquired packet to the analysis node 30 as a response RES corresponding to the acquisition request REQ. The tap 16 may be installed at a position other than the position illustrated in FIG. 3. Instead of capturing packets via tap 16, the capture node 20 may capture a packet via a mirror port (not illustrated) of the network switch 12.

The capture node 20 may capture information such as data transmitted and received between devices other than the terminal device 10 and the server node 14. For example, a computation node may be arranged instead of the server node 14. Alternatively, a server node may be arranged instead of the terminal device 10, and a storage node, a database node, or the like may be arranged instead of the server node 14. The information processing system 100A may include the network switch 12 and the server node 14.

The analysis node 30 includes a packet collection unit 32, a message extraction unit 34, and a memory 40. The memory 40 includes a list region 42 and a program region 44. The memory 40 includes, for example, a memory module including a plurality of synchronous dynamic random access memories (SDRAM). The memory 40 may include a static random access memory (SRAM), a nonvolatile memory such as a flash memory or a magnetoresistive random access memory (MRAM).

The packet collection unit 32 outputs an acquisition request REQ including a packet acquisition condition to the capture node 20 based on an instruction from an operator such as an analyst operating the analysis node 30. The packet collection unit 32 receives the packet to be acquired included in the response RES from the capture node 20. As with the packet collection unit 4 illustrated in FIG. 1, the packet collection unit 32 assumes each of the packets received from the capture node 20 as a head packet, and performs a process of creating a list in the list region 42 for each session. The session indicates communication that is transmitted and received between each pair of the terminal device 10 and the server node 14. An example of the operation of the packet collection unit 32 is illustrated in FIGS. 7A and 7B to FIG. 9.

As with the message extraction unit 5 illustrated in FIG. 1, the message extraction unit 34 finds the head packet from among the packets for each session stored in the list region 42 and acquires the message. The message extraction unit 34 discards from the list region 42 packets other than the head packet. An example of the operation of the message extraction unit 34 is illustrated in FIGS. 7A and 7B to FIG. 9.

A program that implements the functions of the packet collection unit 32 and the message extraction unit 34 is stored in the program region 44 of the memory 40. The functions of the packet collection unit 32 and the message extraction unit 34 may be implemented by hardware.

Figure 4:
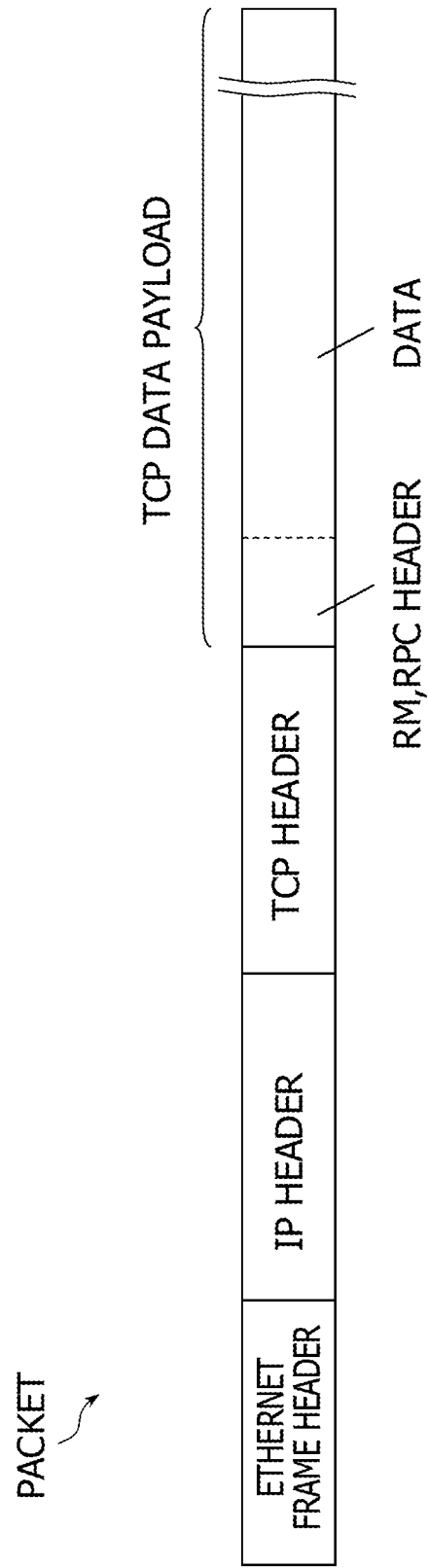
FIG. 4 is a diagram illustrating an example of a structure of a packet captured by a capture node illustrated in FIG. 3.

FIG. 4 illustrates an example of the structure of a packet captured by the capture node 20 illustrated in FIG. 3. Each packet includes an Ethernet frame header, an IP header, a TCP header, and a TCP data payload. The IP header, the TCP header, and the TCP data payload are the Ethernet frame data payload. The Ethernet frame header includes a destination media access control (MAC) address and a transmission source MAC address. The IP header includes an IP packet length indicating the size of the Ethernet frame data payload, a transmission source IP address of the packet, and a destination IP address of the packet.

The TCP header includes the port number of the transmission source of the packet and the port number of the destination of the packet. In a case where the TCP data payload contains the head data of the RPC command (for example, message), the TCP data payload includes a record marking standard (RM) and an RPC header. The structure of the RM and the RPC header is illustrated in FIG. 5.

Figure 5:
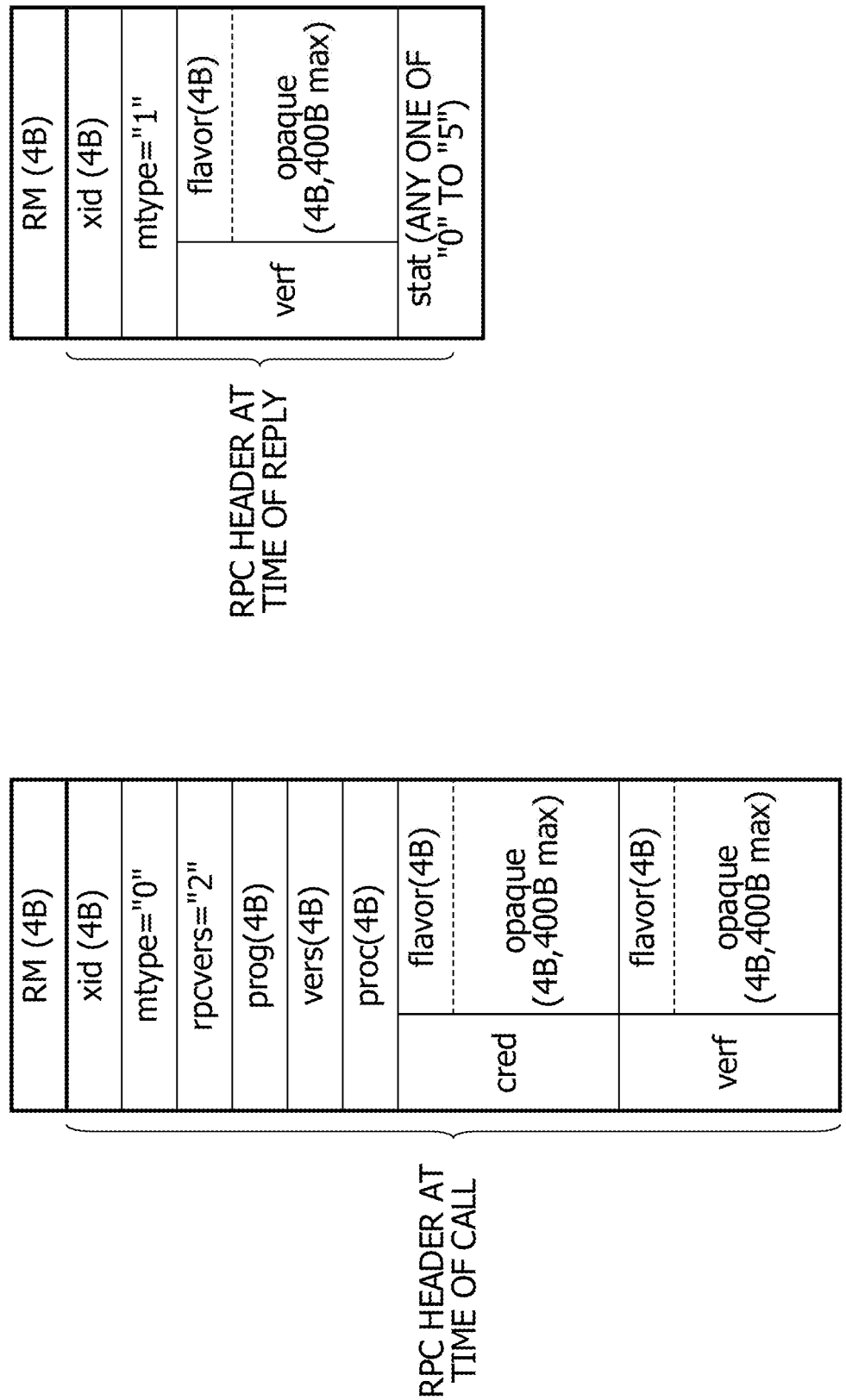
FIG. 5 is a diagram illustrating an example of the structure of an RM and an RPC headers illustrated in FIG. 4.

FIG. 5 illustrates an example of the structure of the RM and the RPC header illustrated in FIG. 4. The RM (4 bytes) contains the fragment length indicating the size (data length) of the RPC command before being divided and stored into a packet. The fragment length includes the size of the RPC header. The RPC header has different specifications between a time of CALL (calling) and a time of REPLY (response).

The RPC header at the time of CALL includes a region where a transaction identifier xid, a message type mtype, and an RPC version number rpcvers are stored (4 bytes each). The transaction identifier xid is set to an any value. The message type mtype="0" represents CALL, and the message type mtype="1" represents REPLY. The RPC version number rpcvers is normally set to "2". Any value except "2" is an abnormal value.

The RPC header at the time of CALL includes a region where any program number prog, any version number vers, and any procedure number proc are set (4 bytes each). The RPC header at the time of CALL includes a region where the authentication information flavor and the authentication information opaque of the client side (cred), and the authentication information flavor and authentication information opaque of the server side (verf) are set. The authentication information flavor has a size of 4 bytes, and set to any value. The authentication information opaque includes 4 bytes of the data length and up to 400 bytes of data.

The RPC header at the response time (REPLY) includes a region where the transaction identifier xid and the message type mtype are set, and a region where the authentication information flavor and the authentication information opaque of the server side (verf) are set. The RPC header at the time of reply (REPLY) has a region where the acceptance status stat is set (4 bytes). The acceptance status stat is set to any one of integers of "0" to "5". Any values other than the above mentioned integer are abnormal values.

FIG. 6 illustrates an example of a plurality of packets transmitted through the network switch 12 illustrated in FIG. 3, and an example in a case where the capture node 20 illustrated in FIG. 3 captures the packets with the head packet lost. In FIG. 6, in order to make the description easy to understand, the capture node 20 captures the packets PCKT corresponding to one session.

For example, packets PCKT1, PCKT2, PCKT3, PCKT4, PCKT5, and PCKT6 are transmitted from a terminal device 10a to a server node 14a. The command RPC1 (D1+D2+D3), which is an RPC command (message), is transmitted using the packets PCKT1 to PCKT3, and the command RPC2 (D4+D5) is transmitted using the packets PCKT4 to PCKT5. The head packet PCKT1 including the head data of the command RPC1 and the head packet PCKT4 including the head data of the command RPC2 include an RM and an RPC header.

The server node 14a extracts the RM and the RPC header from the packet PCKT1, assembles the data D1, D2, and D3 included in the packets PCKT1 to PCKT3, and acquires the command RPC1. The server node 14a extracts the RM and the RPC header from the packet PCKT4, assembles the data D4 and D5 included in the packets PCKT4 to PCKT5, and acquires the command RPC2.

On the other hand, in the example illustrated in FIG. 6, the capture node 20 does not capture the head packet PCKT1, but captures packets PCKT2 to PCKT6 sequentially. For example, an analysis node different from the analysis node 30 assumes that the packet PCKT2 first captured by the capture node 20 is the head packet, and starts a process of acquiring the command RPC.

The different analysis node refers to the false RM from the head of the data D2 in the packet PCKT2, and acquires the fragment length which is the size of the RPC command. For example, since the fragment length is set using 31 bits of the RM, the maximum size that may be specified is 2 gigabytes. In a case where the different analysis node acquires a fragment length indicating 2 gigabytes, the other analysis nodes acquire 2 gigabytes of data from a plurality of packets succeeding the packet PCKT2, and couples 2 gigabytes of data to create a fake command RPC1#.

Thereafter, the different analysis node analyzes the fake command RPC1#, but the analysis fails, and the other analysis nodes discard the acquired 2 gigabyte of data. For example, in a case where the capture node 20 does not acquire the head packet PCKT1 including the RPC command, the different analysis node will acquire a large amount of wasted data that may not be analyzed.

Since the different analysis node acquires the data D5 and D6 in packets PCKT4 and PCKT6 as data located in the midstream of the fake command RPC1#, it does not detect the correct RM and the correct RPC header included in the packets PCKT4 and PCKT6. Therefore, in a case where the capture node 20 does not acquire the head packet PCKT1 including the RPC command, the different analysis node not only fails to acquire the first command RPC1, but also fails to acquire the other commands RPC following the command RPC1. The analysis node 30 illustrated in FIG. 3 solves the above-mentioned problem.

FIGS. 7A and 7B, and FIGS. 8A and 8B illustrate an example of the operation of the analysis node 30 illustrated in FIG. 3. FIGS. 7A and 7B, and FIGS. 8A and 8B, as illustrated in FIG. 6, illustrate the operation of the analysis node 30 when the capture node 20 does not capture the head packet PCKT1, and sequentially captures the packets PCKT2 to PCKT5. FIGS. 7A and 7B, and FIGS. 8A and 8B indicate information stored in the list region 42.

Figure 7A:
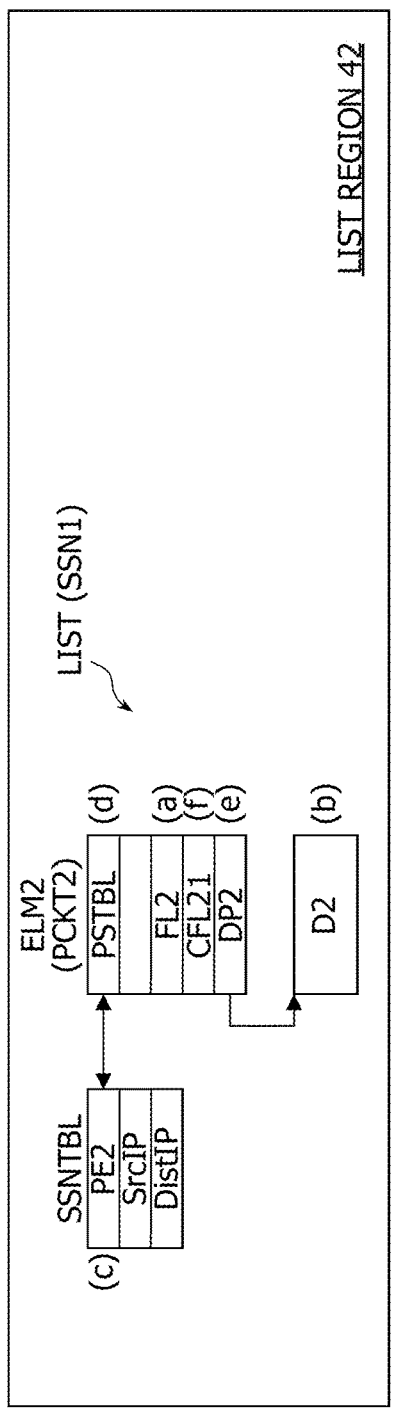
FIGS. 7A and 7B are diagrams illustrating an example of an operation of an analysis node illustrated in FIG. 3.

First, in FIG. 7A, the packet collection unit 32 of the analysis node 30 identifies a session SSN1 based on the combination of the transmission source IP address and the destination IP address included in the IP header of the first packet PCKT2. Thereafter, the packet collection unit 32 identifies the session SSN1 for each of the packets PCKT3 to PCKT5 to be received. The packet collection unit 32 refers to the source IP address SrcIP, and the destination IP address DistIP stored in advance in the session table SSNTBL to find the session table SSNTBL corresponding to the session SSN1. The source IP address SrcIP indicates the transmission source of the packet, and the destination IP address DistIP indicates the destination of the packet.

The packet collection unit 32 stores an element included in the first packet PCKT2 in the element region ELM2 allocated to the region corresponding to the session SSN1 in the list region 42. In a case where there is no session table SSNTBL corresponding to the combination of the transmission source IP address and the destination IP address included in the IP header of the packet PCKT2, a new session table SSNTBL is created. For example, the packet collection unit 32 allocates to the list region 42 a new region for creating the list LIST in accordance with the session SSN1 to create in the allocated region a session table SSNTBL corresponding to the session SSN1. The packet collection unit 32 stores the elements included in the packet PCKT2 in the element region ELM2 allocated to the new region.

The element of the packet PCKT2 stored in the element region ELM2 includes the fragment length FL2 and the data D2 ((a) and (b) in FIG. 7A). Since the packet PCKT2 is not the head packet, the head 4 bytes of the TCP data payload does not indicate a correct RM but indicates the false fragment length FL2. The data D2 is data of the entire TCP data payload illustrated in FIG. 4, and the size of the data D2 is indicated as a correct value according to the packet length included in the IP header of the packet PCKT2.

The packet collection unit 32 stores a pointer PE2 indicating the element region ELM2 in the session table SSNTBL corresponding to session SSN1 ((c) in FIG. 7A). The packet collection unit 32 stores a pointer PSTBL indicating the session table SSNTBL, and a pointer DP2 indicating the head of the region for storing the data D2 in the element region ELM2 ((d) and (e) in FIG. 7A).

The packet collection unit 32 determines the session SSN to which the packet PCKT belongs by comparing the IP address included in the received packet PCKT with the IP address included in the session table SSNTBL. The packet collection unit 32 stores a packet length included in the IP header of the packet PCKT2 (For example, the size of the TCP data payload) in the element region ELM2 as the current fragment length CFL21 ((f) in FIG. 7A). The current fragment length CFL21 includes the size of the RM and the size of the RPC header illustrated in FIG. 5.

Since the fragment length FL2 and the current fragment length CFL21 do not match, the message extraction unit 34 does not perform the operation of extracting the message. In a case where the fragment length FL2 and the current fragment length CFL21 match, the message extraction unit 34 performs a process of extracting the message using the data D2. An example of a process for extracting the message is described in FIG. 8B.

Figure 7B:
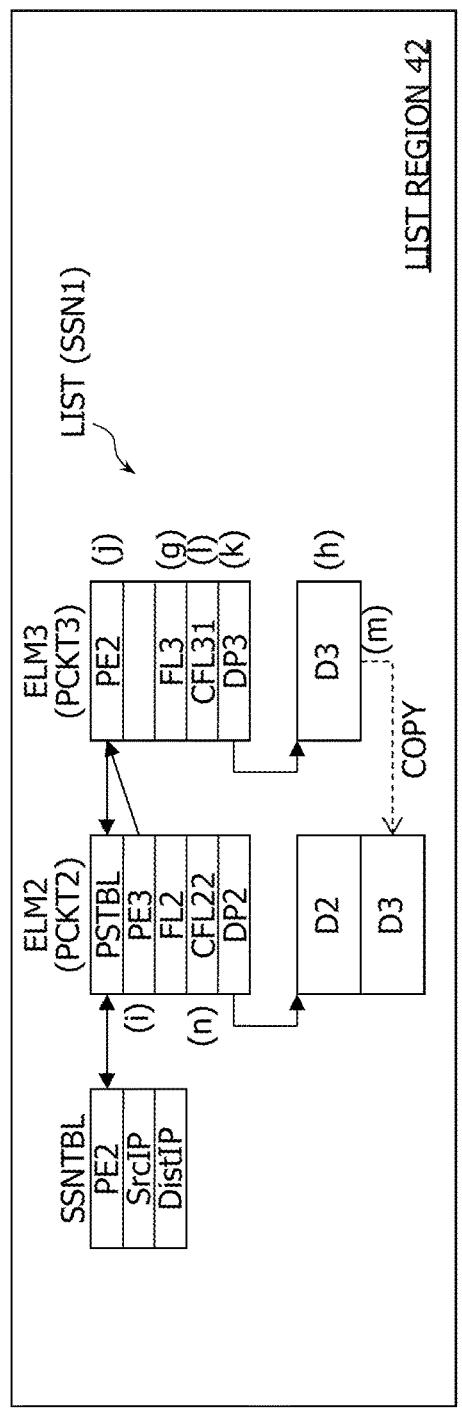

Next, in FIG. 7B, the packet collection unit 32 stores an element included in the packet PCKT3 in the element region ELM3 added to the list LIST. The element of the packet PCKT3 stored in the element region ELM3 includes the false fragment length FL3 and the data D3 (TCP data payload) ((g) and (h) in FIG. 7B).

The packet collection unit 32 stores a pointer PE3 indicating the element region ELM3 in the element region ELM2, and stores the pointer PE2 indicating the element region ELM2 in the element region ELM3 ((i) and (j) in FIG. 7B). The packet collection unit 32 stores a pointer DP3 indicating the head of the region for storing the data D3 in the element region ELM3, and stores the current fragment length CFL31 indicating the size of the data D3 included in the packet PCKT3 in the element region ELM3 ((k) and (l) in FIG. 7B).

The packet collection unit 32 copies the data D3 included in the packet PCKT3 to the element region ELM2, thereby coupling the data D3 to the data D2 stored in the element region ELM2 ((m) in FIG. 7B). The position at which the data D3 is copied to the element region ELM2 is calculated by adding the current fragment length CFL22 to the value of the pointer DP2. The packet collection unit 32 updates the current fragment length CFL21 to the current fragment length CFL22 indicating the size of the data D2 and D3 ((n) in FIG. 7B). The data D3 stored in the element region ELM3 may be used as a copy of the data D3, or the data D3 before being stored in the element region ELM3 included in the packet PCKT3 may be used.

Since the fragment length FL2 and the current fragment length CFL22 do not match, and the fragment length FL3 and the current fragment length CFL31 do not match, the message extraction unit 34 does not perform the operation of extracting the message. As illustrated in FIGS. 7A and 7B, the list LIST for the session SSN1 is created by sequentially adding the elements corresponding to the packets PCKT2 and PCKT3 to the list region 42.

Next, in FIG. 8A, as with FIG. 7B, the packet collection unit 32 stores in the element region ELM4 the element (FL4, D4), and the pointers PE3 and DP4 included in the packet PCKT4, and stores a pointer PE4 in the element region ELM3 ((a) to (e) in FIG. 8A). The packet collection unit 32 couples the data D4 to the data D2 and D3 in the element region ELM2, and couples the data D4 to the data D3 in the element region ELM3 ((f) in FIG. 8A). The packet collection unit 32 stores the updated current fragment lengths CFL23 and CFL32 in the list region 42 ((g) and (h) in FIG. 8A). Since the fragment length FL2 and the current fragment length CFL23 do not match, and the fragment length FL3 and the current fragment length CFL32 do not match, the message extraction unit 34 does not perform the operation of extracting the message.

Next, in FIG. 8B, as with FIGS. 7B and 8A, the packet collection unit 32 performs a process of storing information in the element region ELM5 based on the packet PCKT5 ((i) in FIG. 8B). The packet collection unit 32 performs a process of coupling the data D5 included in the packet PCKT5 to each of the data in the element regions ELM2, ELM3, and ELM4 ((j) in FIG. 8B). The packet collection unit 32 updates the current fragment lengths CFL23, CFL32, and CFL41 to the current fragment lengths CFL24, CFL33, and CFL42 respectively in each of the element regions ELM2, ELM3, and ELM4 ((l) and (m) in FIG. 8B).

The message extraction unit 34 detects that the fragment length FL2 and the current fragment length CFL24 do not match, and detects that the fragment length FL3 and the current fragment length CFL33 do not match. On the other hand, the packet PCKT4 is a true head packet, and the RPC command is included in the data D4 and D5 included in the packets PCKT4 and PCKT5. Thus, the message extraction unit 34 detects that the fragment length FL4 and the current fragment length CFL42 match ((n) in FIG. 8).

The message extraction unit 34 discards the first 4 bytes corresponding to the RM from the data D4 (TCP data payload of the packet PCKT4), thereby extracting the RPC command, which is a message including the RPC header ((o) in FIG. 8B). Thereafter, the message extraction unit 34 discards the elements stored in the other element regions ELM2, ELM3, and ELM5 in which the fragment length FL and the current fragment length CFL do not match ((p), (q) and (r) in FIG. 8B). The message extraction unit 34 discards the element region ELM4, for example, in a case where the analysis processing of the RPC command extracted from the element region ELM4 and other processing are completed.

In this way, in a case where element regions ELM corresponding to each of the packets are sequentially added to the list LIST, connecting the element regions ELM with a pointer makes it possible to make the connection relation between the element regions ELM correspond in order of the reception of the packets. By indicating the region where data is stored by pointers DP2 and DP3, and so forth, it is possible to allocate, in the element regions ELM, a region for storing the elements included in the packet and a region for storing the data to different places in the list region 42.

In a case where the size of each element region ELM is set considering that data is coupled up to the maximum fragment length, it is possible to arrange parameter regions other than the region for storing data in each element region ELM at a position close to each other in the address space. As a result, for example, it is possible to improve the access efficiency of the list region 42 in a case of updating the current fragment length CFL of the plurality of element regions ELM or other case, compared with the case where the parameter regions are not arranged close to each other.

Figure 9:
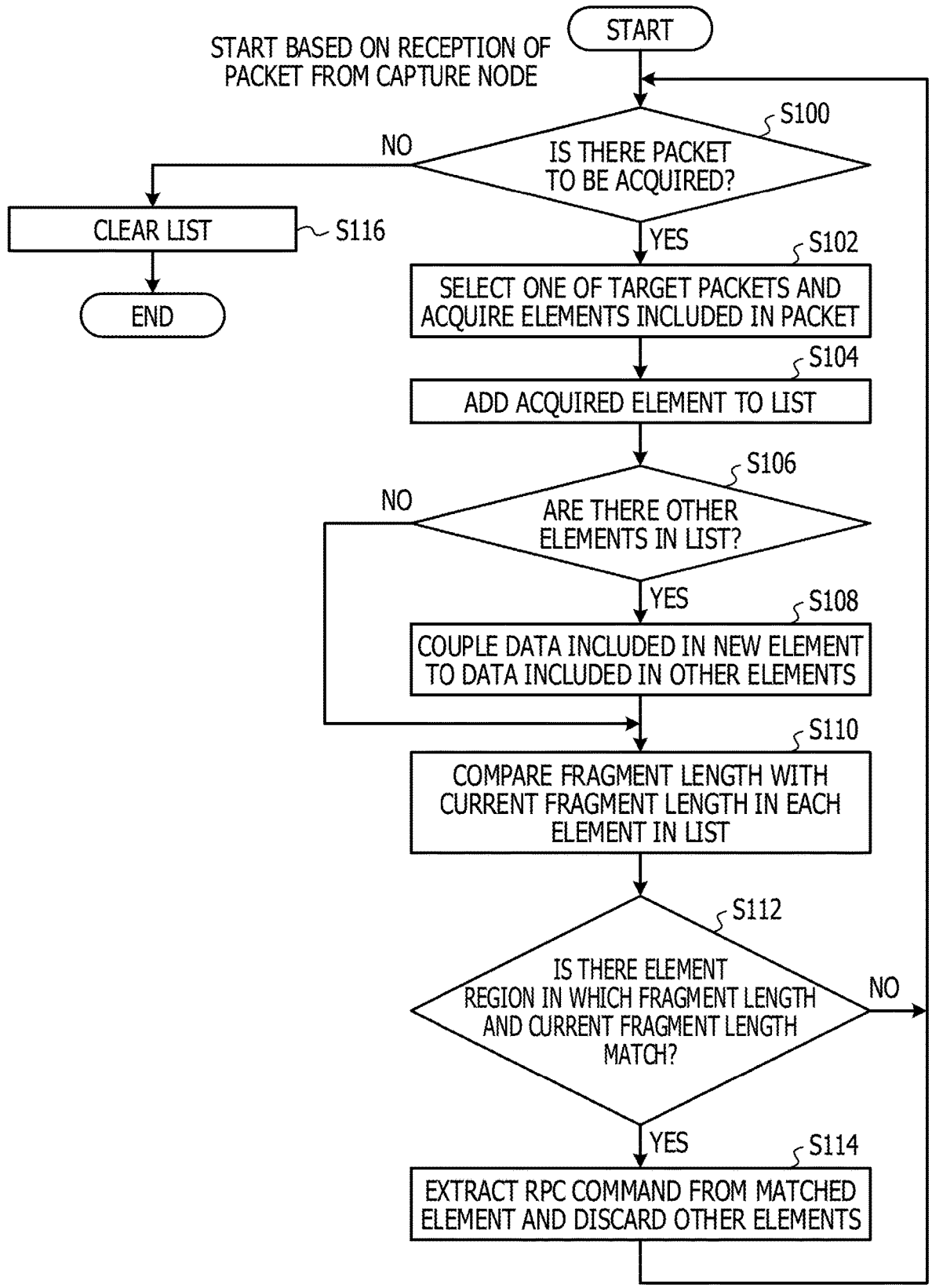
FIG. 9 is a diagram illustrating an example of an operation flow of the analysis node illustrated in FIG. 3.

FIG. 9 illustrates an example of an operation flow of the analysis node 30 illustrated in FIG. 3. For example, FIG. 9 illustrates an example of an information processing method by the information processing device and a program performed by the information processing device.

The analysis node 30 starts the operation flow illustrated in FIG. 9 for each session SSN based on the reception of the packet to be analyzed from the capture node 20. Therefore, the packet collection unit 32 of the analysis node 30 refers to the IP header of the received packet, and determines the session SSN to which each packet belongs. For example, the analysis node 30 stores the packet received from the capture node 20 in a predetermined buffer region of the memory 40, and performs the operation flow illustrated in FIG. 9 by using the packet stored in the predetermined buffer region.

First, in step S100, in a case where there is a packet to be acquired from which an RPC command is acquired wherein the packet is a packet in which an element has not been added to the list LIST illustrated in FIGS. 7A and 8B, or FIGS. 8A and 7B, the packet collection unit 32 transfers the process to step S102. In a case where there is no packet to be acquired from which the RPC command is acquired, the packet collection unit 32 transfers the process to step S116.

In step S102, the packet collection unit 32 selects the packet with the earliest reception time from among the packets in which the element has not been added to the list LIST, and acquires elements such as a fragment length, data and so forth included in the selected packet. Next, in step S104, the packet collection unit 32 stores the element such as the acquired fragment length and data in the element region ELM of the list LIST corresponding to the session SSN to which the packet belongs. For example, the packet collection unit 32 adds the element included in the packet to the list LIST.

Next, in step S106, the packet collection unit 32 determines whether the other element regions ELM in which the elements are stored are present in the list LIST. In a case where the other element regions ELM in which the elements are stored are present in the list LIST, the process proceeds to step S108, and in a case where no other element regions ELM in which elements are stored are present in the list LIST, the process proceeds to step S118.

In step S108, the packet collection unit 32 couples the data included in the newly acquired element in step S104 to the data included in the other element regions ELM. In step S110, the message extraction unit 34 compares the fragment length FL with the current fragment length CFL in each element region ELM in the list LIST. Next, in step S112, in a case where there is an element region ELM in which the fragment length FL and the current fragment length CFL match, the message extraction unit 34 determines that the RPC command has been detected, and transfers the process to step S114. On the other hand, in a case where there is no element region ELM in which the fragment length FL and the current fragment length CFL match, the message extraction unit 34 determines that the RPC command has not been detected, and returns the process to step S100.

In step S114, the message extraction unit 34 removes the RM from the data included in the element region ELM in which the fragment length FL and the current fragment length CFL match, and extracts the RPC command including the RPC header. The message extraction unit 34 discards the element stored in the other element regions ELM in which the fragment length FL and the current fragment length CFL do not match. The message extraction unit 34 returns the process to step S100 in order to extract the next RPC command.

In step S116, since there is no packet to be acquired from which the RPC command is acquired, the message extraction unit 34 discards the elements included in the element region ELM remaining in the list LIST, to thereby clear the list LIST is cleared, and terminates the process. For example, the message extraction unit 34 discards an element included in the element region ELM from which the RPC command is extracted, and which is left without being discarded.

As described above, in the embodiments illustrated in FIGS. 3 to 9, as with the embodiment illustrated in FIGS. 1 and 2, in a case where the head packet is unknown, it is possible to leave only the element region corresponding to the head packet for each session SSN, and discard the elements included in the other element regions ELM. Since the data including the message is stored in the element region corresponding to the head packet, it is possible to use the element region left in the list region 42, and extract the messages for each session SSN. When the fragment length matches the size of the coupled data, it is possible to extract the message from the list region 7. A process of coupling the data by assuming that all packets are head packets is performed, whereby it is possible to acquire the message even when the packet received first is not the head packet.

In the embodiment illustrated in FIGS. 3 to 9, connecting the element regions ELM with a pointer makes it possible to make the connection relation between the element regions ELM correspond in order of the reception of the packets. The parameter regions of the element region ELM are arranged at positions close to each other. As a result, it is possible to improve the access efficiency of the list region 42 in a case of updating the current fragment length CFL of the plurality of element regions ELM or other case, compared with the case where the parameter regions are not arranged close to each other.

Figure 10:
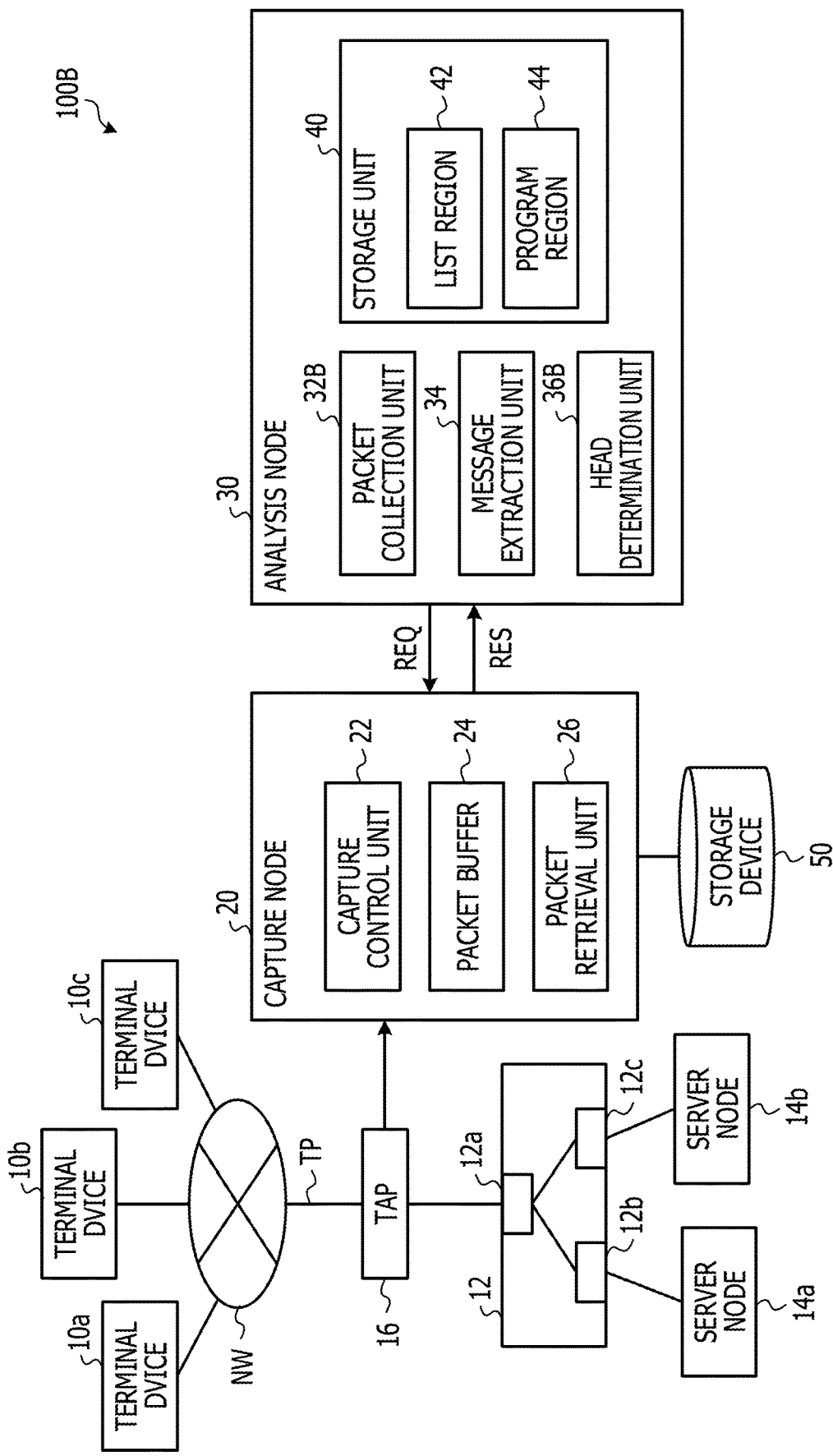
FIG. 10 is a diagram illustrating another embodiment of an information processing device, an information processing method, and a program.

FIG. 10 illustrates another embodiment of an information processing device, an information processing method, and a program. Elements that are the same as or similar to those described in the embodiment illustrated in FIG. 3 are denoted by the same reference numerals, and a detailed description thereof will be omitted. As with the information processing system 100A in FIG. 3, an information processing system 100B illustrated in FIG. 10 includes the capture node 20 connected to the tap 16, the storage device 50 connected to the capture node 20, and the analysis node 30 connected to the capture node 20.

The analysis node 30 includes a packet collection unit 32B instead of the packet collection unit 32 illustrated in FIG. 3. The analysis node 30 includes a head determination unit 36B. Other configurations of the analysis node 30 are the same as those in FIG. 3.

The head determination unit 36B determines based on the element included in the packet whether there is a possibility that the packet is a head packet. In a case where the head determination unit 36B determines that there is a possibility that the packet is the head packet, the packet collection unit 32B performs a process of storing the element of the packet in the list region. On the other hand, in a case where the head determination unit 36B determines that there is no possibility of a packet as the head packet, the packet collection unit 32B does not perform the process of storing the elements of the packet in the list region. An example of the operation of the analysis node 30 illustrated in FIG. 10 is illustrated in FIGS. 11A and 11B to FIG. 14.

FIGS. 11A and 11B, and FIGS. 12A and 12B illustrate an example of the operation of the analysis node 30 illustrated in FIG. 10. Detailed description of the same or similar operations as those in FIGS. 7A and 7B, and FIGS. 8A and 8B will be omitted. As with FIGS. 7A and 7B, and FIGS. 8A and 8B, FIGS. 11A and 11B, and FIGS. 12A and 12B illustrate the operation of the analysis node 30 when the capture node 20 does not capture the head packet PCKT1, and sequentially captures the packets PCKT2 to PCKT5.

In FIG. 11A, the head determination unit 36B performs a process of determining whether there is a possibility that the packet PCKT2 is a head packet, and determines that there is no possibility that the packet PCKT2 is a head packet. In a case where the head determination unit 36B determines that there is no possibility that the packet PCKT2 is a head packet, the packet collection unit 32B does not perform a process of storing the elements included in the packet PCKT2 in the element region ELM2 ((a) in FIG. 11A). In FIG. 11A, the rectangular frame indicated by the broken line illustrated in the list LIST indicates that the elements included in the packet PCKT2 is not stored in the element region ELM2.

Next, in FIG. 11B, the head determination unit 36B determines that there is no possibility of the packet PCKT3 is a head packet. As a result, as with FIG. 11A, the packet collection unit 32B does not perform a process of storing the elements included in the packet PCKT3 in the element region ELM3 ((b) in FIG. 11B).

Figure 12A:
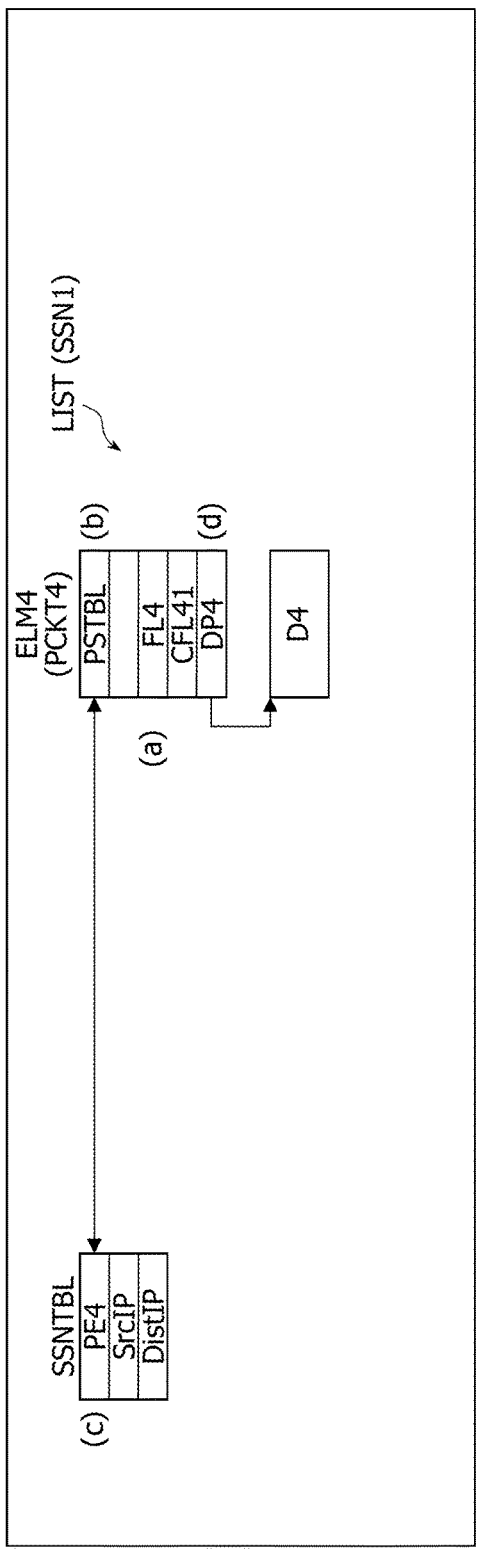
FIGS. 12A and 12B are diagrams illustrating a subsequent operation of the analysis node in FIGS. 11A and 11B.

Next, in FIG. 12A, the head determination unit 36B determines that there is a possibility that the packet PCKT4 is a head packet. In a case where the head determination unit 36B determines that there is a possibility that the packet PCKT4 is a head packet, the packet collection unit 32B performs a process of storing the elements included in the packet PCKT4 in the element region ELM4 ((a) in FIG. 12A). The packet collection unit 32B stores the pointer PSTBL indicating the session table SSNTBL in the element region ELM4, and stores the pointer PE4 indicating the element region ELM4 in the session table SSNTBL ((b) and (c) in FIG. 12A). The packet collection unit 32B stores a pointer DP4 indicating the head of the region storing the data D4 in the element region ELM2 ((d) in FIGS. 12A and 12B).

Figure 12B:
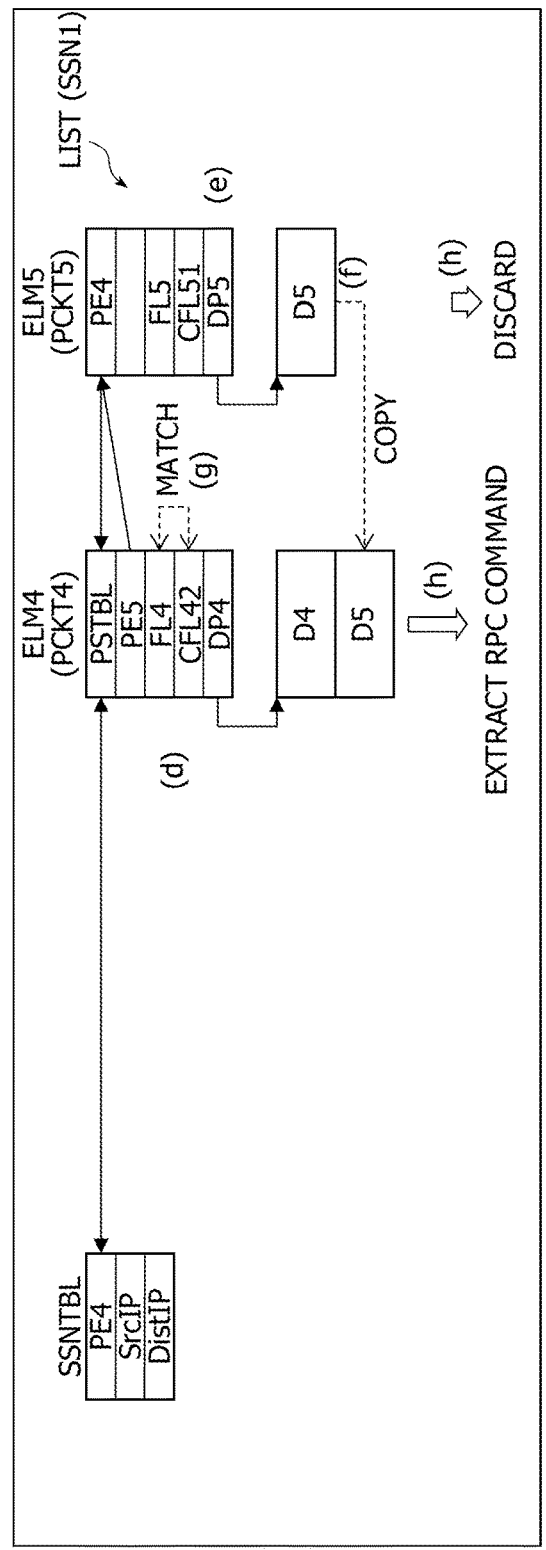

In FIG. 12B, the head determination unit 36B determines that there is no possibility of the packet PCKT5 is a head packet. However, the element region ELM4 corresponding to the other packets PCKT4 different from the packet PCKT5 has been already stored in the list LIST. In this case, as with FIG. 8B, the packet collection unit 32B performs a process of storing the elements included in the packet PCKT5 in the element region ELM5 ((e) in FIG. 12B). The packet collection unit 32B performs a process of coupling the data D5 included in the packet PCKT5 to the data D4 in the element region ELM4 ((f) in FIG. 12B).

After this, as with FIG. 8B, the message extraction unit 34 detects that the fragment length FL4 and the current fragment length CFL42 match, and extracts an RPC command, which is a message including an RPC header ((g) and (h) in FIG. 12B). A message extraction unit 34B discards the element region ELM5 in which the fragment length FL and the current fragment length CFL do not match ((i) in FIG. 12B). For example, in a case where the analysis processing of the RPC command extracted from the element region ELM4 and other processing are completed, the message extraction unit 34 discards the element region ELM4.

As illustrated in FIGS. 11A and 11B, and FIGS. 12A and 12B, the analysis node 30 does not perform a process of storing the elements included in the packet having no possibility of being a head packet in the list LIST. As a result, it is possible to avoid unnecessary elements from being held in the list region 42. It is possible to reduce the size of the list region 42, compared with the case where the elements of all the received packet PCKT are stored in the list region 42. This makes it possible to effectively use the storage region of the memory 40.

FIG. 13 illustrates an example of an operation flow of the analysis node 30 illustrated in FIG. 10. For example, FIG. 13 illustrates an example of an information processing method by the information processing device and a program performed by the information processing device. Processes which are the same as or similar to that in FIG. 9 are denoted by the same reference numerals, and a detailed description thereof will be omitted. In FIG. 13, steps S200, S103, S120, and S122 are added with respect to FIG. 9. Steps S200 and S103 are inserted between step S102 and step S104 in FIG. 9.

In step S102, after acquiring an element such as fragment length and data from the packet, in step S200, the head determination unit 36B determines whether there is a possibility that the packet from which the element has been acquired is a head packet. An example of the operation of step S200 is illustrated in FIG. 14.

Next, in step S103, in a case where there is a possibility that the packet is a head packet, the process proceeds to step S104, and in a case where there is no possibility that the packet is a head packet, the process proceeds to step S120. In and after step S104, as in FIG. 9, processing of adding an element included in the packet to the element region ELM, and coupling the data, and so forth is performed. The processing in and after step S104 is performed only on the packet having the possibility of being a head packet.

In step S120, in a case where the other element regions ELM in which elements are stored are present in the list LIST, the process proceeds to step S122, and in a case where no other element regions ELM are present in the list LIST, the process returns to step S100. In step S122, the packet collection unit 32B adds the fragment length and data elements acquired from the packet to the list LIST, transfers the process to step S108, and performs a process of coupling the data.

Figure 14:
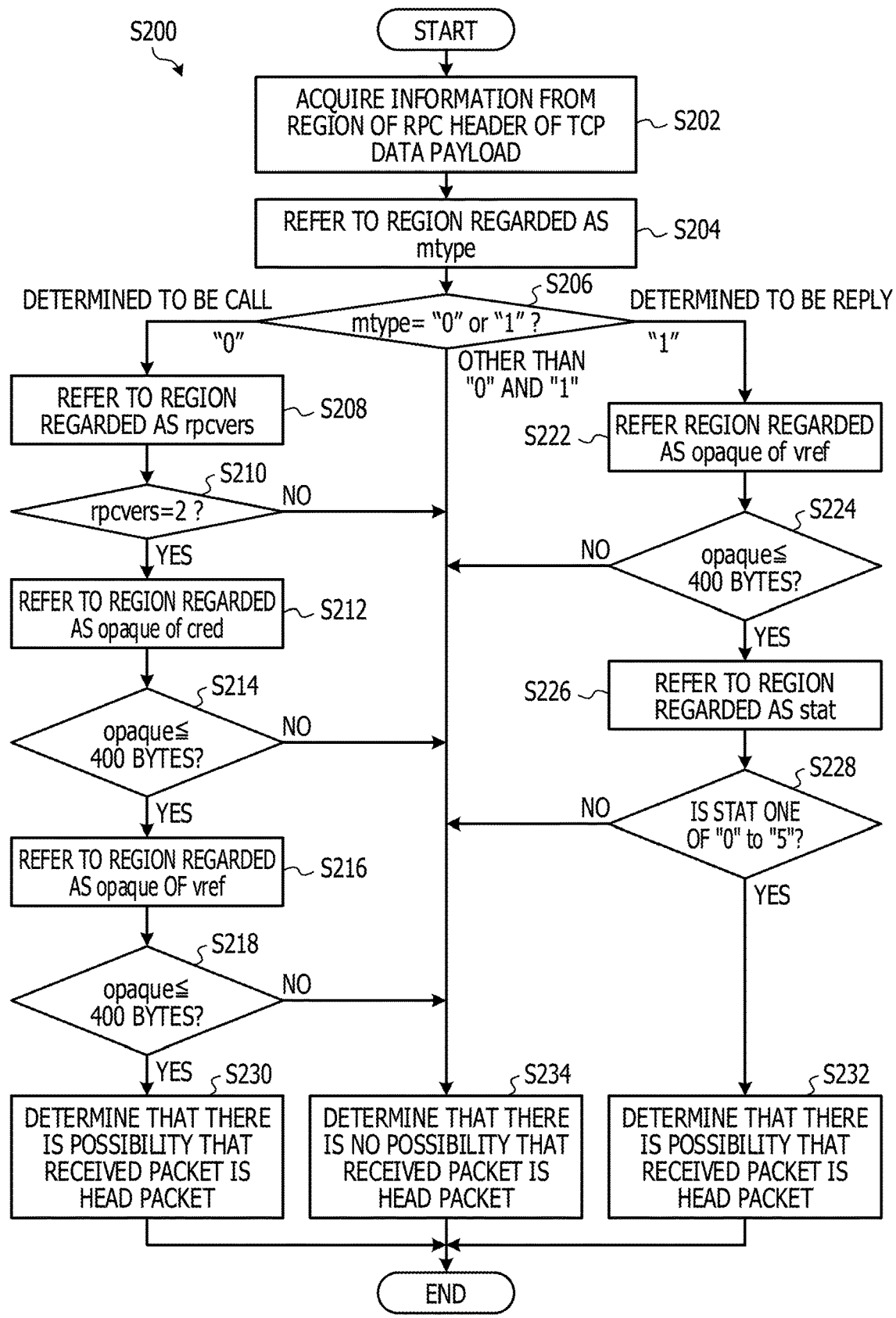
FIG. 14 is a diagram illustrating an example of an operation flow of step S200 illustrated in FIG. 13.

FIG. 14 illustrates an example of the operation flow of step S200 illustrated in FIG. 13. First, in step S202, the head determination unit 36B refers to the TCP data payload included in the packet, and acquires the information stored in the region of the RPC header included in the TCP data payload in a case where the packet is a head packet.

Next, in step S204, the head determination unit 36B refers to the region regarded as the message type mtype of the RPC header. Next, in step S206, in a case where the message type mtype is "0", the head determination unit 36B determines that the region is an RPC header at the time of CALL (calling), and transfers the process to step S208. In a case where the message type mtype is "1", the head determination unit 36B determines that the region is an RPC header at the time of REPLY (response), and transfers the process to step S222. In a case where the message type mtype is neither "0" nor "1", the head determination unit 36B determines that the region is not an RPC header, and transfers the process to step S234.

In step S208, the head determination unit 36B refers to the region that is regarded as the RPC version number rpcvers. Next, in step S210, the head determination unit 36B transfers the process to step S212 in a case where the RPC version number rpcvers is "2" and transfers the process to step S234 in a case where the RPC version number rpcvers is other than "2".

In step S212, the head determination unit 36B refers to a region regarded as authentication information opaque on the client side (cred). Next, in step S214, the head determination unit 36B transfers the process to step S216 in a case where the authentication information opaque is 400 bytes or less, and transfers the process to step S234 in a case where the authentication information opaque exceeds 400 bytes.

In step S216, the head determination unit 36B refers to a region regarded as authentication information opaque on the server side (verf). Next, in step S218, the head determination unit 36B transfers the process to step S230 in a case where the authentication information opaque is 400 bytes or less, and transfers the process to step S234 in a case where the authentication information opaque exceeds 400 bytes. In step S230, the head determination unit 36B determines that there is a possibility that the received packet is a head packet, and terminates the process.

On the other hand, in step S222, the head determination unit 36B refers to a region regarded as authentication information opaque on the server side (verf). Next, in step S224, the head determination unit 36B transfers the process to step S226 in a case where the authentication information opaque is 400 bytes or less, and transfers the process to step S234 in a case where the authentication information opaque exceeds 400 bytes.

In step S226, the head determination unit 36B refers to a region regarded as the acceptance status stat. Next, in step S228, the head determination unit 36B transfers the process to step S232 in a case where the acceptance status stat is any one of "0" to "5", and transfers the process to step S234 in a case where the acceptance status stat is neither "0" nor "5". In step S232, the head determination unit 36B determines that there is a possibility that the received packet is a head packet, and terminates the process. On the other hand, in step S234, the head determination unit 36B determines that there is no possibility of the received packet is a head packet, and terminates the process.

As described above, by using the information of the RPC header in which the predetermined value is set, it is possible to determine whether there is a possibility that the packet is a head packet. Use of a plurality of parameters of the RPC header makes it possible to improve the accuracy of the determination result of the possibility of the head packet, compared with the case where the determination is performed by using a single parameter. In spite of the fact that it is determined that there is a possibility that the packet is a head packet, it may not actually be the head packet. The reason may be that the packet is not the head packet because correct analysis may not be performed since the extracted RPC command is incorrect.

As described above, as in the embodiment illustrated in FIGS. 1 to 9, in the embodiments illustrated in FIGS. 10 to 14, in a case where the head packet is unknown, it is possible to leave only the element region corresponding to the head packet for each session SSN, and discard the elements included in the other element regions. Since the data including the message is stored in the element region corresponding to the head packet, it is possible to use the element region left in the list region 42, and extract the messages for each session SSN. When the fragment length matches the size of the coupled data, it is possible to extract the message from the list region 7. A process of coupling the data by assuming that all packets are head packets is performed, whereby it is possible to acquire the message even when the packet received first is not the head packet.

In the embodiment illustrated in FIG. 10 to FIG. 14, the packet collection unit 32B does not perform a process of storing the elements included in the packet having no possibility of being a head packet in the list LIST. As a result, it is possible to avoid unnecessary elements from being held in the list region 42. It is possible to reduce the size of the list region 42, compared with the case where the elements of all the received packets PCKT are stored in the list region 42 and data are coupled. This makes it possible to effectively use the storage region of the memory 40.

By using the information of the RPC header in which the value in the predetermined range is stored, it is possible to determine whether there is a possibility that the packet is a head packet. Use of a plurality of parameters of the RPC header makes it possible to improve the accuracy of the determination result of the possibility of the head packet, compared with the case where the determination is performed by using a single parameter.

Figure 15:
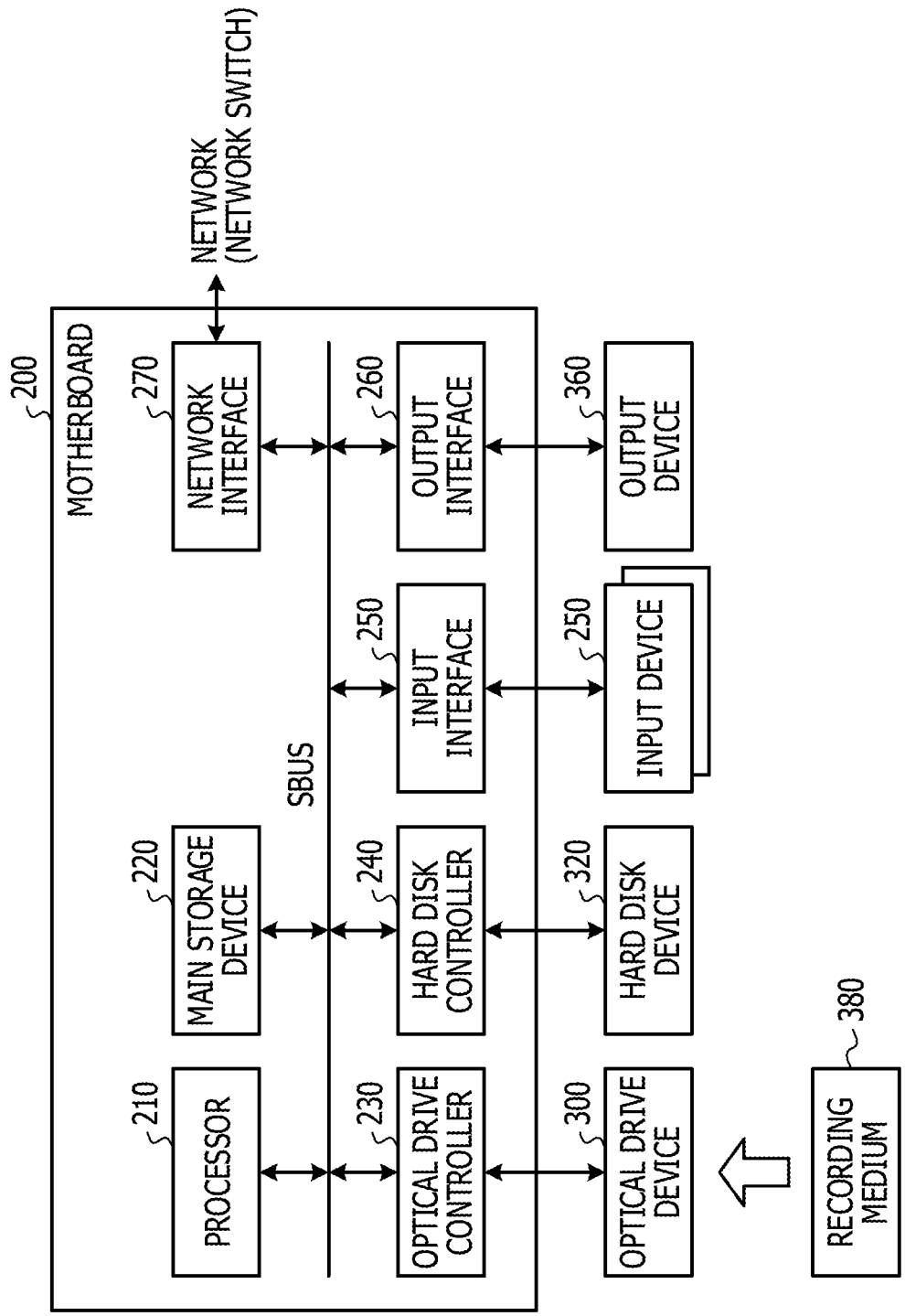
FIG. 15 is a diagram illustrating an example of a hardware configuration of the information processing device illustrated in FIG. 1 and the analysis nodes illustrated in FIGS. 3 and 10.

FIG. 15 is a diagram illustrating an example of a hardware configuration of the information processing device 3 illustrated in FIG. 1 and the analysis node 30 illustrated in FIGS. 3 and 10. Since the information processing device 3 and the analysis node 30 have the same configuration, hereinafter, the configuration of the analysis node 30 will be described.

The analysis node 30 includes a mother board 200, an optical drive device 300, a hard disk device 320, an input device 340, an output device 360, and so forth. The mother board 200 includes various components such as a processor 210, a main storage device 220, an optical drive controller 230, a hard disk controller 240, an input interface 250, an output interface 260, and a network interface 270. For example, the processor 210 may be a central processing unit (CPU), a graphics processing unit (GPU) or the like.

The processor 210, the main storage device 220, the optical drive controller 230, the hard disk controller 240, the input interface 250, the output interface 260, and the network interface 270 are connected to a system bus SBUS. The main storage device 220 corresponds to the storage unit 6 illustrated in FIG. 1 and the memory 40 illustrated in FIG. 3 and so forth. The processor 210, the optical drive controller 230, the hard disk controller 240, the input interface 250, the output interface 260, and the network interface 270 may be included in a common semiconductor chip. The processor 210 executes the program (the program stored in the program region 44 in FIGS. 3 and 10) stored in the main storage device 220, thereby implementing the function of the analysis node 30.

The optical drive controller 230 is connected to the optical drive device 300, and may access a recording medium 380 installed in the optical drive device 300. The recording medium 380 is a compact disc (CD: registered trademark), a digital versatile disc (DVD: registered trademark), and for example, stores a program executed by the processor 210. Programs and so forth executed by the processor 210 are downloaded from the recording medium 380 to the hard disk device 320 via the optical drive device 300, and transferred to the main storage device 220. The processor 210 may download the program from the recording medium 380 to the main storage device 220 without through the hard disk device 320.

The hard disk controller 240 is connected to the hard disk device 320. For example, when the analysis node 30 is turned on, the processor 210 transfers the program stored in the hard disk device 320 to the main storage device 220, and operates by executing the program transferred to the main storage device 220.

The input interface 250 is connected to the input device 340 such as a keyboard and a mouse. The output interface 260 is connected to the output device 360 such as a display and a printer. The network interface 270 is connected to the capture node 20 and so forth illustrated in FIGS. 3 and 10.

Feature points and advantages of the embodiments will be clarified by the above detained explanation. This intends to extend the scope of claims to the feature points and the advantages of the embodiments without departing from the spirit of claims. Those having ordinary knowledge in the technical field may be able to easily conceive all improvements and modifications. Therefore, the scope of the embodiments having inventiveness is not intended to be limited to the scope explained above and may depend on appropriate improvements and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
   a memory; and
   a processor coupled to the memory and the processor configured to execute a process, the process including:
   when a first packet transmitted from a communication device to another communication device via a network is captured, extracting, from the first packet, first element data corresponding to a session used for communication of the first packet;
   storing, in a storage device, the extracted first element data in association with the first packet and the session;
   when second element data associated with a second packet and the session is stored in the storage unit, coupling the extracted first element data to the second element data;
   obtaining, for each of the first packet and the second packet, a data value from a predetermined position in a packet, the predetermined position being a position at which a fragment length is stored in a case where the packet is a head packet; and
   when a data size of a specific element data that is one of the first element data and the second element data, for which the coupling has been executed, matches the obtained data value corresponding to the packet associated with the specific element data, discarding element data, associated with the session, other than the specific element data from the storage device.

2. The information processing device according to claim 1, wherein the process further includes:
   determining the specific element data, matching the obtained data value, to be a message; and
   discarding the specific element data from the storage device after the message is retrieved.

3. The information processing device according to claim 1, wherein the process further includes:
   determining, for each of the first packet and the second packet, whether there is a possibility that the packet is the head packet;
   preventing element data corresponding to the packet determined not to be the head packet from being stored in the storage device.

4. The information processing device according to claim 3, wherein
   a data payload of the head packet including a fragment length includes a header region that stores a plurality of parameters used for transmitting and receiving a message; and wherein
   the determining whether there is the possibility includes:
   referring to the plurality of parameters included in the header region with assumes that each packet is a head packet; and
   determining that a packet, corresponding to an element in which at least one of the referred parameters is an abnormal value, has no possibility of being the head packet.

5. The information processing device according to claim 1, wherein
   the coupling includes:
   replicating the first element data; and
   coupling the replicated element data to the second element data.

6. The information processing device according to claim 1,
   wherein each of a plurality of pieces of the element data stored in the storage unit includes the fragment length, a packet pointer indicating an order relation of the plurality of pieces of the element data, a current fragment length indicating a size of the element data, and a data pointer indicating a storage position of the element data.

7. An information processing method executed by a computer, the information processing method comprising:
   when a first packet transmitted from a communication device to another communication device via a network is captured, extracting, from the first packet, first element data corresponding to a session used for communication of the first packet;
   storing, in a storage device, the extracted first element data in association with the first packet and the session;
   when second element data associated with a second packet and the session is stored in the storage unit, coupling the extracted first element data to the second element data;
   obtaining, for each of the first packet and the second packet, a data value from a predetermined position in a packet, the predetermined position being a position at which a fragment length is stored in a case where the packet is a head packet; and
   when a data size of a specific element data that is one of the first element data and the second element data, for which the coupling has been executed, matches the obtained data value corresponding to the packet associated with the specific element data, discarding element data, associated with the session, other than the specific element data from the storage device.

8. A non-transitory computer-readable storage medium storing a program that causes a computer to execute a process, the process comprising:
   when a first packet transmitted from a communication device to another communication device via a network is captured, extracting, from the first packet, first element data corresponding to a session used for communication of the first packet;
   storing, in a storage device, the extracted first element data in association with the first packet and the session;
   when second element data associated with a second packet and the session is stored in the storage unit, coupling the extracted first element data to the second element data;
   obtaining, for each of the first packet and the second packet, a data value from a predetermined position in a packet, the predetermined position being a position at which a fragment length is stored in a case where the packet is a head packet; and
   when a data size of a specific element data that is one of the first element data and the second element data, for which the coupling has been executed, matches the obtained data value corresponding to the packet associated with the specific element data, discarding element data, associated with the session, other than the specific element data from the storage device.

\* \* \* \* \*